US012568498B2

(12) United States Patent
Huang et al.

(10) Patent No.: US 12,568,498 B2
(45) Date of Patent: Mar. 3, 2026

(54) FULL-DUPLEX TECHNIQUES IN WIRELESS COMMUNICATIONS

(71) Applicant: Qualcomm Incorporated, San Diego, CA (US)

(72) Inventors: Min Huang, Beijing (CN); Wanshi Chen, San Diego, CA (US); Chao Wei, Beijing (CN); Qiaoyu Li, Beijing (CN); Yu Zhang, San Diego, CA (US); Yuwei Ren, Beijing (CN); Liangming Wu, Beijing (CN); Chenxi Hao, Beijing (CN); Changlong Xu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 654 days.

(21) Appl. No.: 17/635,324

(22) PCT Filed: Aug. 26, 2019

(86) PCT No.: PCT/CN2019/102447
§ 371 (c)(1),
(2) Date: Feb. 14, 2022

(87) PCT Pub. No.: WO2021/035457
PCT Pub. Date: Mar. 4, 2021

(65) Prior Publication Data
US 2022/0312471 A1 Sep. 29, 2022

(51) Int. Cl.
*H04W 72/14* (2009.01)
*H04L 5/14* (2006.01)
(Continued)

(52) U.S. Cl.
CPC ............... *H04W 72/23* (2023.01); *H04L 5/14* (2013.01); *H04W 72/0446* (2013.01);
(Continued)

(58) Field of Classification Search
CPC ............. H04W 52/365; H04W 52/281; H04W 52/346; H04W 52/243; H04W 72/0473;
(Continued)

(56) References Cited

U.S. PATENT DOCUMENTS 5,844,940 A * 12/1998 Goodson ............. H04W 52/367
375/222
2011/0218020 A1 * 9/2011 Ripley ...................... H03F 3/24
455/571
(Continued)

FOREIGN PATENT DOCUMENTS

CN 104115421 A 10/2014
CN 109565843 A 4/2019
(Continued)

OTHER PUBLICATIONS

International Search Report and Written Opinion—PCT/CN2019/102447—ISA/EPO—May 15, 2020 (194588WO1).
(Continued)

*Primary Examiner* — Syed Ali
(74) *Attorney, Agent, or Firm* — Holland & Hart LLP

(57) ABSTRACT

Methods, systems, and devices for wireless communications are described in which a base station operating in full-duplex mode may provide for reception of one or more higher priority transmissions using at least partially overlapping time-frequency resources as used for transmission of lower priority communications. In order to mitigate self-interference at the base station, a transmission power used for the overlapping time-frequency resources may be reduced. The base station may provide an indication of a subset of resources that have a reduced transmission power, an amount of the power reduction for the subset of resources, or both.

26 Claims, 22 Drawing Sheets

(51) Int. Cl.

| | |
|---|---|
| *H04W 72/044* | (2023.01) |
| *H04W 72/0446* | (2023.01) |
| *H04W 72/0453* | (2023.01) |
| *H04W 72/23* | (2023.01) |
| *H04W 88/08* | (2009.01) |

(52) U.S. Cl.
CPC ... *H04W 72/0453* (2013.01); *H04W 72/0473* (2013.01); *H04W 88/08* (2013.01)

(58) Field of Classification Search
CPC ............. H04W 72/0453; H04W 72/23; H04W 52/262; H04W 72/0446; H04L 5/14
See application file for complete search history.

(56) References Cited

U.S. PATENT DOCUMENTS

| | | | |
|---|---|---|---|
| 2013/0301484 A1 | 11/2013 | Khandani | |
| 2015/0382375 A1 | 12/2015 | Bhushan et al. | |
| 2016/0359608 A1 | 12/2016 | Noh et al. | |
| 2019/0158263 A1* | 5/2019 | Lee | H04L 5/14 |

| | | | |
|---|---|---|---|
| 2020/0084735 A1* | 3/2020 | Cheng | H04W 52/146 |
| 2020/0136661 A1* | 4/2020 | Eliaz | H04W 52/228 |
| 2020/0145927 A1* | 5/2020 | Sun | H04W 52/146 |
| 2020/0359331 A1* | 11/2020 | Park | H04W 76/27 |
| 2021/0160787 A1* | 5/2021 | Zhou | H04W 52/146 |
| 2021/0258887 A1* | 8/2021 | Osawa | H04W 52/242 |
| 2021/0345254 A1* | 11/2021 | Zhou | H04W 52/367 |
| 2022/0104222 A1* | 3/2022 | Ahn | H04L 5/0051 |
| 2022/0225322 A1* | 7/2022 | Shim | H04L 1/1858 |

FOREIGN PATENT DOCUMENTS

| | | |
|---|---|---|
| EP | 1739858 A1 | 1/2007 |
| WO | WO-2010107907 A2 | 9/2010 |
| WO | WO-2015094914 A1 | 6/2015 |

OTHER PUBLICATIONS

Supplementary European Search Report—EP19942906—Search Authority—Apr. 18, 2023 (194588EP).
Taiwan Search Report—TW109128421—TIPO—Nov. 24, 2024 (194588TW).

* cited by examiner

DL Communication Resources 215

URLLC Transmission 220

200

305

Shared Channel Wireless Resources

*frequency*

*time*

■ DMRS 310

▫ Nominal Power Resources 315

▨ Reduced Power Resources 320

300

710

715

720

705

700

1210       1215       1220

1205

1200

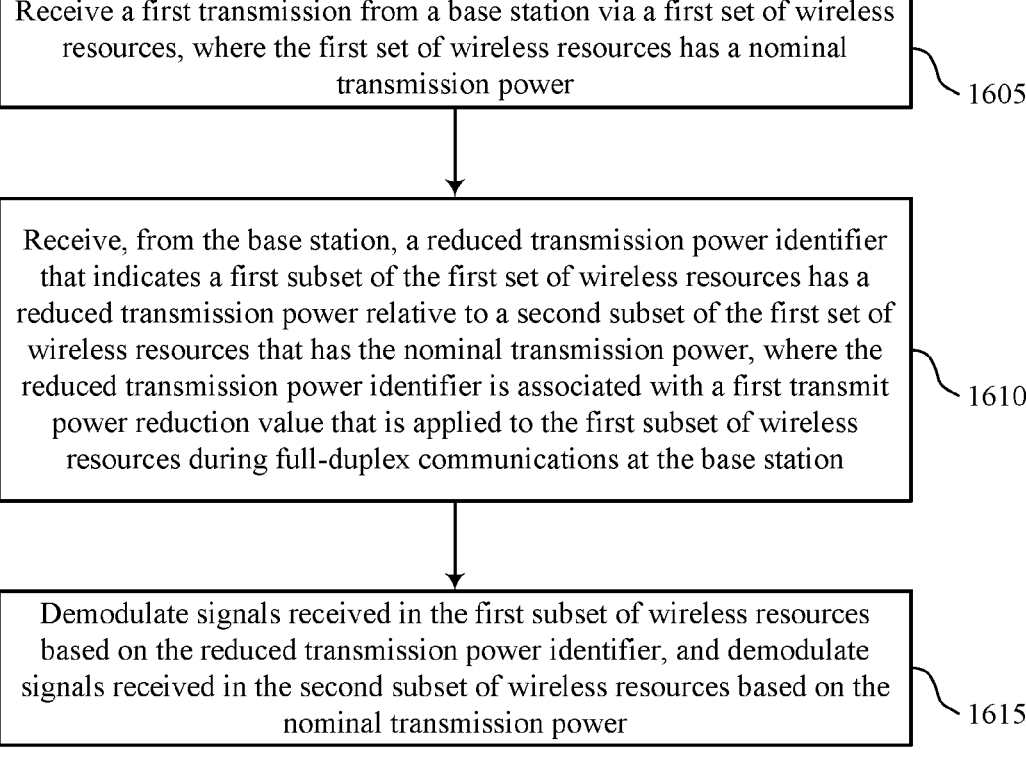

Receive a first transmission from a base station via a first set of wireless resources, where the first set of wireless resources has a nominal transmission power

1605

Receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station

1610

Demodulate signals received in the first subset of wireless resources based on the reduced transmission power identifier, and demodulate signals received in the second subset of wireless resources based on the nominal transmission power

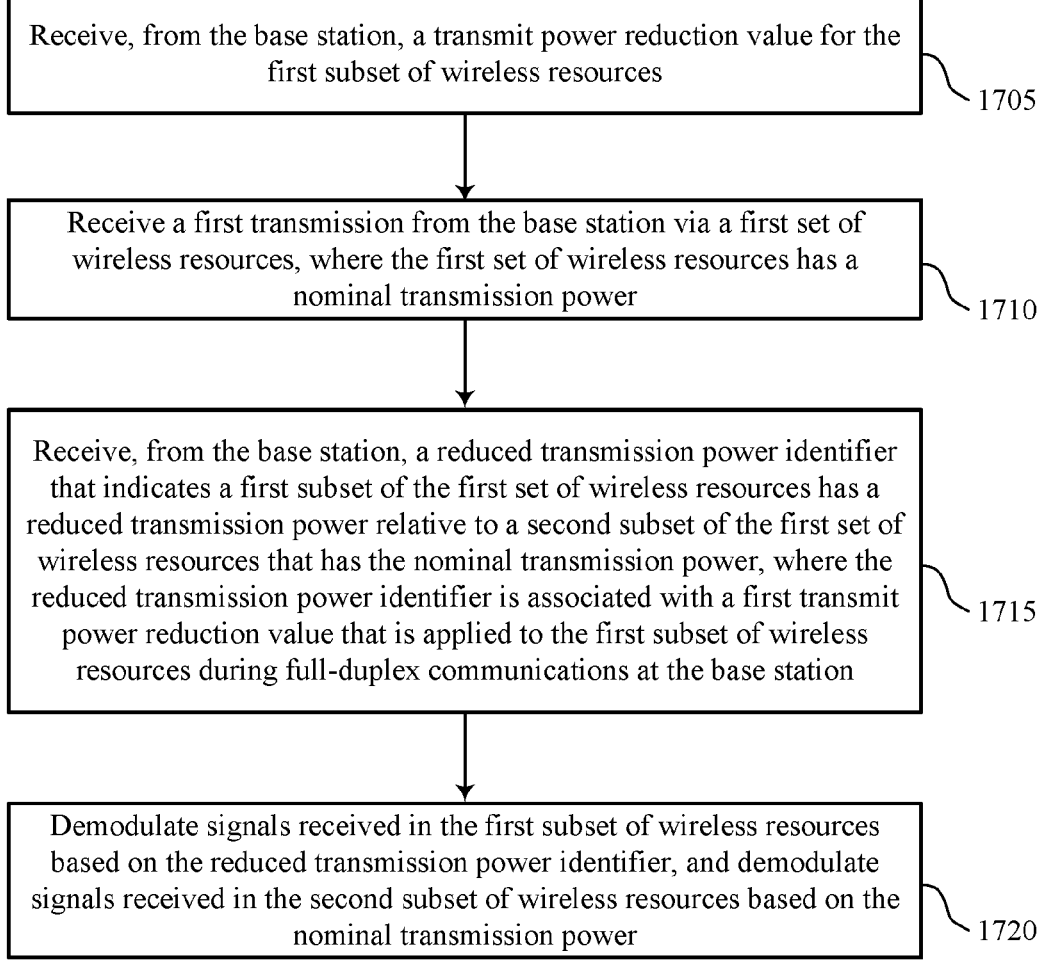

Receive, from the base station, a transmit power reduction value for the first subset of wireless resources

1705

Receive a first transmission from the base station via a first set of wireless resources, where the first set of wireless resources has a nominal transmission power

1710

Receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station

1715

Demodulate signals received in the first subset of wireless resources based on the reduced transmission power identifier, and demodulate signals received in the second subset of wireless resources based on the nominal transmission power

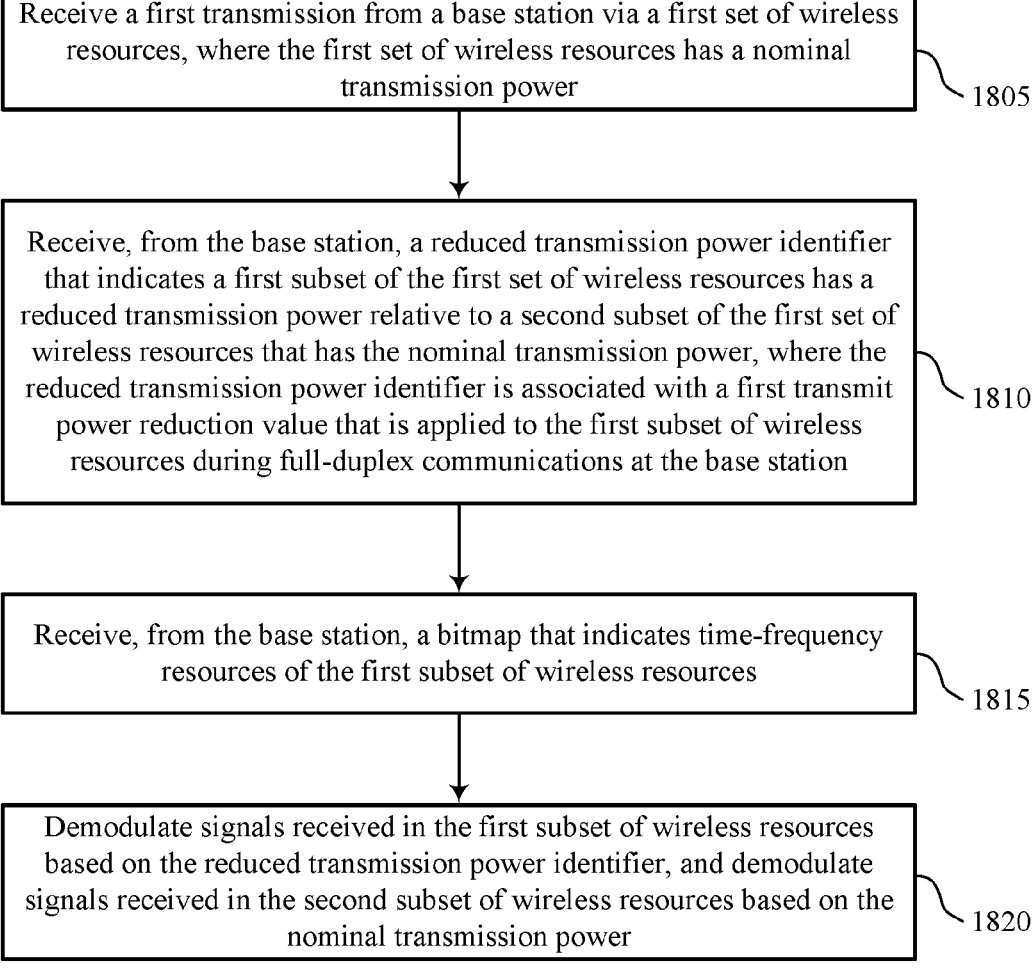

Receive a first transmission from a base station via a first set of wireless resources, where the first set of wireless resources has a nominal transmission power

1805

Receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station

1810

Receive, from the base station, a bitmap that indicates time-frequency resources of the first subset of wireless resources

1815

Demodulate signals received in the first subset of wireless resources based on the reduced transmission power identifier, and demodulate signals received in the second subset of wireless resources based on the nominal transmission power

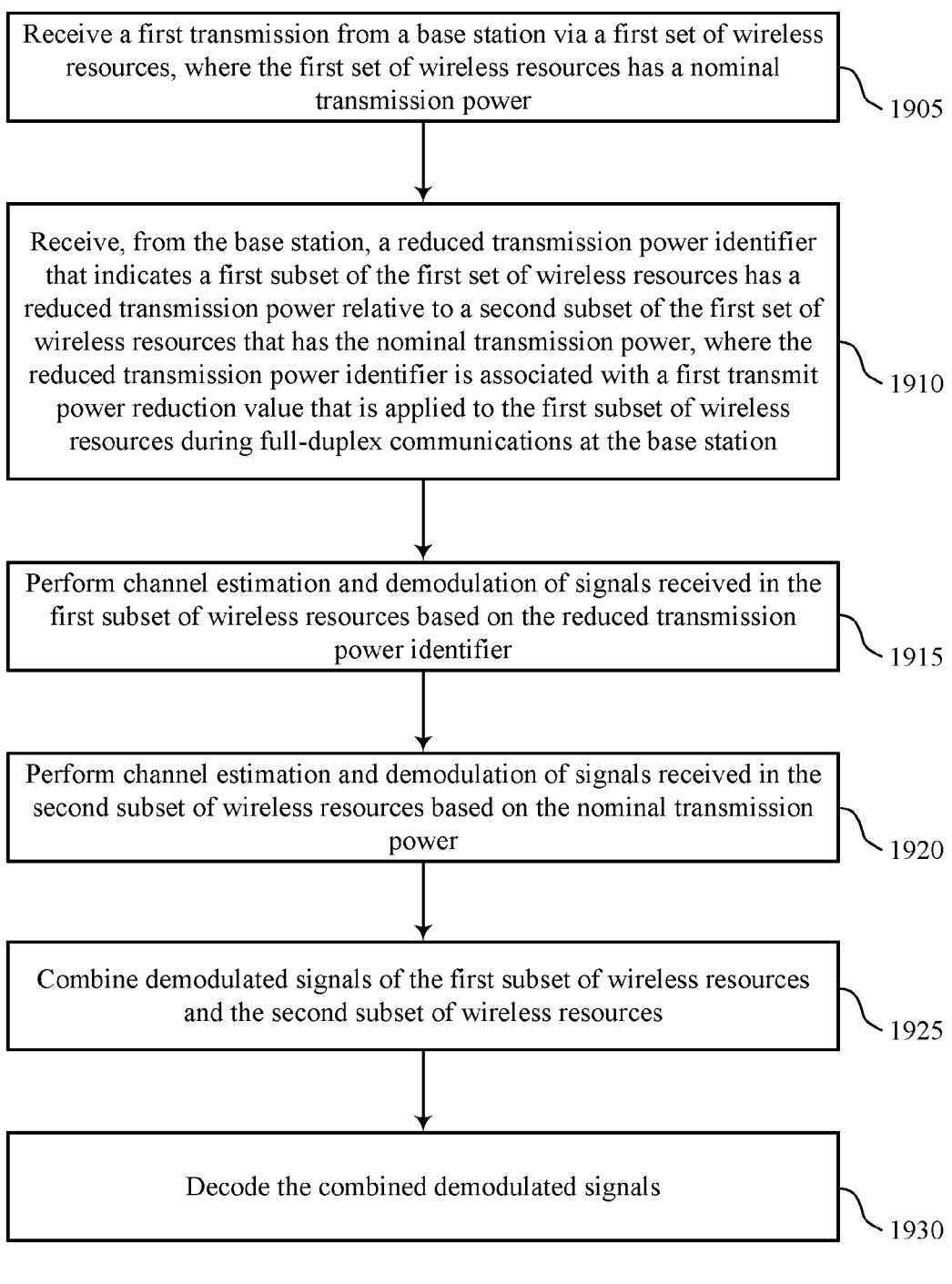

Receive a first transmission from a base station via a first set of wireless resources, where the first set of wireless resources has a nominal transmission power ⟍ 1905

Receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station ⟍ 1910

Perform channel estimation and demodulation of signals received in the first subset of wireless resources based on the reduced transmission power identifier ⟍ 1915

Perform channel estimation and demodulation of signals received in the second subset of wireless resources based on the nominal transmission power ⟍ 1920

Combine demodulated signals of the first subset of wireless resources and the second subset of wireless resources ⟍ 1925

Decode the combined demodulated signals ⟍ 1930

Identify a first set of wireless resources for a first transmission to a first wireless device

2105

Determine a nominal transmission power for the first transmission

2110

Receive an indication that a second wireless device is to transmit to the base station using a first subset of the first set of wireless resources

2115

Determine a reduced transmission power relative to the nominal transmission power for a first portion of the first transmission to be transmitted in the first subset of wireless resources, where the reduced transmission power is applied during full-duplex communications using the first subset of wireless resources

2120

Transmit the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission

2125

Transmit, to the first wireless device, a reduced transmission power identifier that indicates the first subset of the first set of wireless resources has the reduced transmission power relative to the nominal transmission power

2130

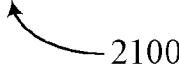

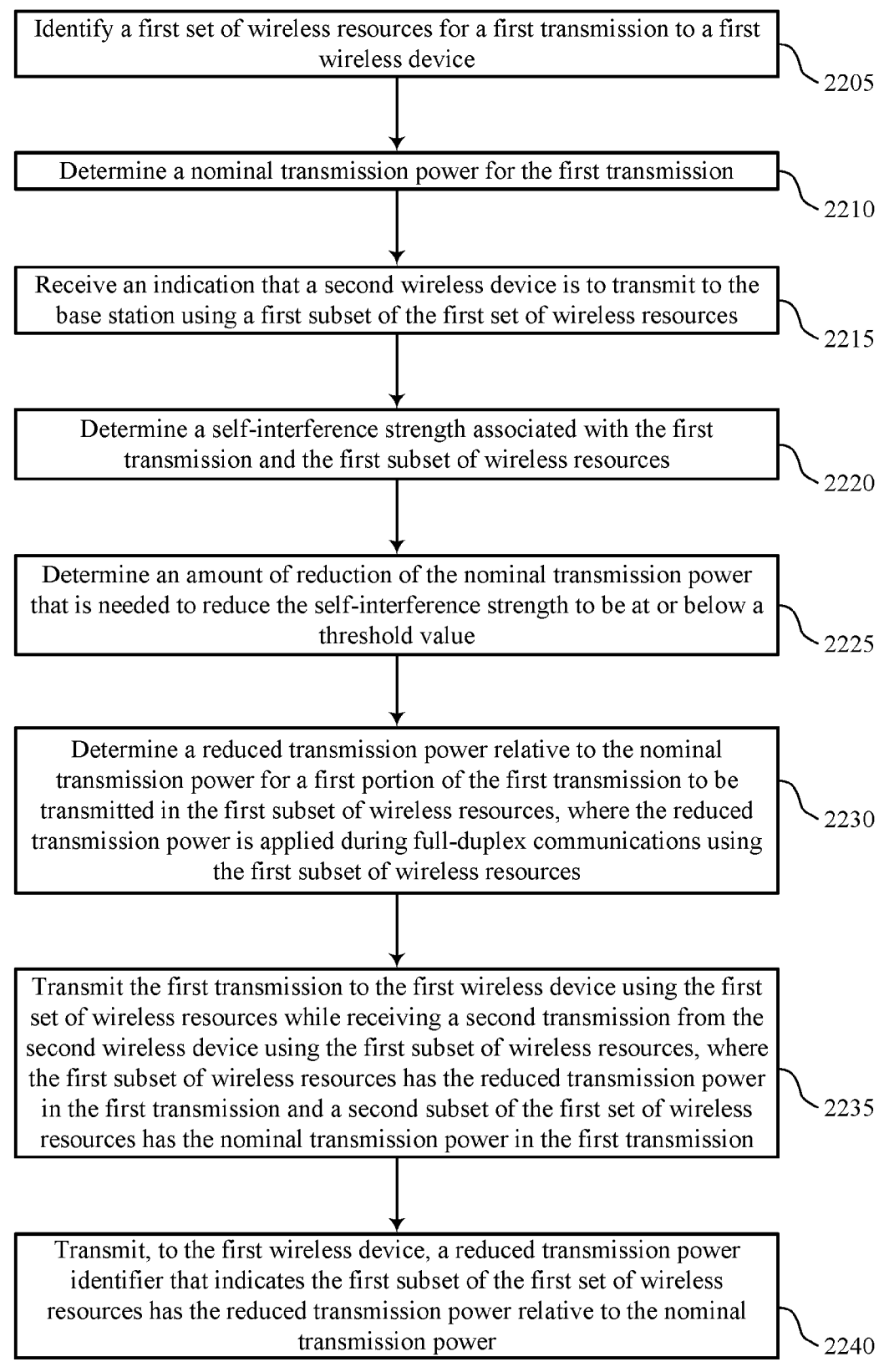

Identify a first set of wireless resources for a first transmission to a first wireless device

2205

Determine a nominal transmission power for the first transmission

2210

Receive an indication that a second wireless device is to transmit to the base station using a first subset of the first set of wireless resources

2215

Determine a self-interference strength associated with the first transmission and the first subset of wireless resources

2220

Determine an amount of reduction of the nominal transmission power that is needed to reduce the self-interference strength to be at or below a threshold value

2225

Determine a reduced transmission power relative to the nominal transmission power for a first portion of the first transmission to be transmitted in the first subset of wireless resources, where the reduced transmission power is applied during full-duplex communications using the first subset of wireless resources

2230

Transmit the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission

2235

Transmit, to the first wireless device, a reduced transmission power identifier that indicates the first subset of the first set of wireless resources has the reduced transmission power relative to the nominal transmission power

FULL-DUPLEX TECHNIQUES IN WIRELESS COMMUNICATIONS

CROSS REFERENCE

The present application is a 371 national stage filing of International PCT Application No. PCT/CN2019/102447 by Huang et al., entitled "FULL-DUPLEX TECHNIQUES IN WIRELESS COMMUNICATIONS," filed Aug. 26, 2019, which is assigned to the assignee hereof, and which is expressly incorporated by reference in its entirety herein.

BACKGROUND

The following relates generally to wireless communications, and more specifically to full-duplex techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may be capable of both transmitting traffic to a receiver (e.g., a UE or another base station) and receiving traffic from another transmitter (e.g., a UE or another base station) simultaneously using time and frequency resources that are at least partially overlapping. This capability of communicating in two directions using at least partially overlapping time-frequency resources may be referred to as a full-duplex capability of the base station. When operating in a full-duplex mode, the transmission of the base station a self-interference at the base station, which can impact the concurrent reception. Efficient techniques for managing such self-interference may thus be desired to help enhance system performance and reliability.

SUMMARY

The described techniques relate to improved methods, systems, devices, and apparatuses that support full-duplex techniques in wireless communications. The described techniques relate to improved methods, systems, devices, and apparatuses that support full-duplex techniques in wireless communications. In various aspects, self-interference at a full-duplex base station may be mitigated through reduced transmission power in wireless resources that have concurrent transmission and reception at a base station. Such reduced transmission power of a transmission from the base station may reduce the self-interference seen for the reception at the base station, which may enhance the likelihood of successfully decoding the reception. The base station may provide an indication to a wireless device (e.g., a user equipment (UE) or another base station) that is to receive the transmission to indicate the reduced transmission power. In some cases, the indication may indicate which wireless resources used reduced transmission power, and the receiving wireless device may use the indication to assist in demodulating and decoding the transmission. In some cases, the indication may also indicate an amount of the power reduction.

The base station, in some cases, may provide an access link to one or more UEs, and may reduce power for a portion of a downlink transmission to a first UE when an uplink transmission from a second UE is in full-duplex with the portion of the downlink transmission. In some cases, the base station may not have advance knowledge of the uplink transmission from the second UE, such as in cases where the uplink transmission is associated with a higher priority communication (e.g., a ultra-reliable low-latency communication (URLLC)) than that of the downlink transmission (e.g., which may be a lower priority enhanced mobile broadband (eMBB) communication). Additionally or alternatively, the base station may be an integrated access and backhaul (IAB) node, and the transmission from the base station may be an uplink backhaul transmission to a parent IAB node, a portion of which is in full-duplex with receipt of an uplink transmission from a child IAB node or a UE.

A method of wireless communication is described. The method may include receiving, at a first wireless device, a first transmission from a base station via a first set of wireless resources, where the first set of wireless resources has a nominal transmission power, receiving, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station, demodulating signals received in the first subset of wireless resources based on the reduced transmission power identifier, and demodulating signals received in the second subset of wireless resources based on the nominal transmission power.

An apparatus for wireless communication is described. The apparatus may include a processor, memory coupled with the processor, and instructions stored in the memory. The instructions may be executable by the processor to cause the apparatus to receive, at a first wireless device, a first transmission from a base station via a first set of wireless resources, where the first set of wireless resources has a nominal transmission power, receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station, demodulate signals received in the first subset of wireless resources based on the reduced transmission power identifier, and demodulate signals received in the second subset of wireless resources based on the nominal transmission power.

Another apparatus for wireless communication is described. The apparatus may include means for receiving, at a first wireless device, a first transmission from a base station via a first set of wireless resources, where the first set of wireless resources has a nominal transmission power, receiving, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station, demodulating signals received in the first subset of wireless resources based on the reduced transmission power identifier, and demodulating signals received in the second subset of wireless resources based on the nominal transmission power.

A non-transitory computer-readable medium storing code for wireless communication is described. The code may include instructions executable by a processor to receive, at a first wireless device, a first transmission from a base station via a first set of wireless resources, where the first set of wireless resources has a nominal transmission power, receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station, demodulate signals received in the first subset of wireless resources based on the reduced transmission power identifier, and demodulate signals received in the second subset of wireless resources based on the nominal transmission power.

In some examples of the method, apparatuses, and non-transitory computer-readable medium described herein, the reduced transmission power provides for reduced self-interference at the base station during full-duplex communications. In some examples of the method, apparatuses, and non-transitory computer-readable medium described herein, the reduced transmission power identifier provides an indication of time resources, frequency resources, or combinations thereof, of the first subset of wireless resources, and an indication of an amount of power reduction relative to the nominal transmission power.

In some examples of the method, apparatuses, and non-transitory computer-readable medium described herein, the first wireless device is a UE, and where the method further may include operations, features, means, or instructions for receiving downlink control information from the base station that indicates a downlink grant with the first set of wireless resources. In some examples of the method, apparatuses, and non-transitory computer-readable medium described herein, the downlink control information further indicates wireless resources for data transfer with the nominal transmission power.

In some examples of the method, apparatuses, and non-transitory computer-readable medium described herein, the first wireless device is a parent integrated access and backhaul (IAB) node and the base station is an IAB node, and where the method further may include operations, features, means, or instructions for transmitting an uplink grant to the base station that indicates the first set of wireless resources for data transfer from the IAB node to the parent IAB node. In some examples of the method, apparatuses, and non-transitory computer-readable medium described herein, the uplink grant further indicates wireless resources for data transfer with the nominal transmission power.

Some examples of the method, apparatuses, and non-transitory computer-readable medium described herein may further include operations, features, means, or instructions for receiving, from the base station, a transmit power reduction value for the first subset of wireless resources. In some examples of the method, apparatuses, and non-transitory computer-readable medium described herein, the transmit power reduction value is received together with the reduced transmission power identifier or separately from the reduced transmission power identifier. In some examples of the method, apparatuses, and non-transitory computer-readable medium described herein, the transmit power reduction value may be received in a RRC message, in a medium access control (MAC) control element, in a physical layer message, or any combinations thereof.

In some examples of the method, apparatuses, and non-transitory computer-readable medium described herein, the transmit power reduction value may be a static value received in a system information transmission from the base station that is applied to multiple different wireless devices that receive transmissions from the base station. In some examples of the method, apparatuses, and non-transitory computer-readable medium described herein, the transmit power reduction value may be received in a dedicated message to the first wireless device, and where the dedicated message is received in a different subset of wireless resources than the first subset of wireless resources or a different set of wireless resources than the first set of wireless resources.

In some examples of the method, apparatuses, and non-transitory computer-readable medium described herein, the transmit power reduction value may be a dynamic value received in a control information transmission from the base station that is associated with the first set of wireless resources. In some examples of the method, apparatuses, and non-transitory computer-readable medium described herein, the control information transmission may be a common control information transmission or a dedicated control information transmission to the first wireless device.

Some examples of the method, apparatuses, and non-transitory computer-readable medium described herein may further include operations, features, means, or instructions for receiving, from the base station, a bitmap that indicates time-frequency resources of the first subset of wireless resources. In some examples of the method, apparatuses, and non-transitory computer-readable medium described herein, the first set of wireless resources is divided into a set of parts of time-frequency dimensions, and where each element of the bitmap is associated with a different part of the set of parts of time-frequency dimensions. In some examples of the method, apparatuses, and non-transitory computer-readable medium described herein, the first set of wireless resources are divided into a set of blocks of time-frequency resources, each block of time-frequency resources having a time-domain start position and length and a frequency-domain start position and length, and where the first subset of wireless resources is indicated by an identification of one or more of the set of blocks of time-frequency resources.

Some examples of the method, apparatuses, and non-transitory computer-readable medium described herein may further include operations, features, means, or instructions for receiving, from the base station, a joint indication of the first subset of wireless resources and a transmit power reduction value for the first subset of wireless resources. In some examples of the method, apparatuses, and non-transitory computer-readable medium described herein, the first set of wireless resources is divided into a set of parts of time-frequency dimensions and the joint indication includes a bitmap, where a first segment of bits of the bitmap indicates a first transmit power reduction value for a first part of time-frequency dimensions, and a second segment of bits of the bitmap indicates a second transmit power reduction value for a second part of time-frequency dimensions.

In some examples of the method, apparatuses, and non-transitory computer-readable medium described herein, the demodulating may include operations, features, means, or instructions for performing channel estimation and demodulation of signals received in the first subset of wireless resources based on the reduced transmission power identifier, performing channel estimation and demodulation of signals received in the second subset of wireless resources based on the nominal transmission power, combining demodulated signals of the first subset of wireless resources and the second subset of wireless resources, and decoding the combined demodulated signals.

In some examples of the method, apparatuses, and non-transitory computer-readable medium described herein, the channel estimation and demodulation of the signals received in the first subset of wireless resources is based on a demodulation reference signal that is transmitted in the first subset of wireless resources. In some examples of the method, apparatuses, and non-transitory computer-readable medium described herein, the channel estimation and demodulation of the signals received in the first subset of wireless resources is based on a demodulation reference signal that is transmitted in the second subset of wireless resources, and where a channel gain of the second subset of wireless resources determined based on the demodulation reference signal is adjusted based on the reduced transmission power to obtain an adjusted channel gain associated with the first subset of wireless resources.

Some examples of the method, apparatuses, and non-transitory computer-readable medium described herein may further include operations, features, means, or instructions for determining that the first transmission is not successfully decoded at the first wireless device, requesting a retransmission of the first transmission from the base station, demodulating the retransmission of the first transmission from the base station, combining the demodulated first transmission and the demodulated retransmission of the first transmission to generate a combined transmission, and decoding the combined transmission.

A method of wireless communication is described. The method may include identifying, at a base station, a first set of wireless resources for a first transmission to a first wireless device, determining a nominal transmission power for the first transmission, receiving an indication that a second wireless device is to transmit to the base station using a first subset of the first set of wireless resources, determining a reduced transmission power relative to the nominal transmission power for a first portion of the first transmission to be transmitted in the first subset of wireless resources, where the reduced transmission power is applied during full-duplex communications using the first subset of wireless resources, transmitting the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission, and transmitting, to the first wireless device, a reduced transmission power identifier that indicates the first subset of the first set of wireless resources has the reduced transmission power relative to the nominal transmission power.

An apparatus for wireless communication is described. The apparatus may include a processor, memory coupled with the processor, and instructions stored in the memory. The instructions may be executable by the processor to cause the apparatus to identify, at a base station, a first set of wireless resources for a first transmission to a first wireless device, determine a nominal transmission power for the first transmission, receive an indication that a second wireless device is to transmit to the base station using a first subset of the first set of wireless resources, determine a reduced transmission power relative to the nominal transmission power for a first portion of the first transmission to be transmitted in the first subset of wireless resources, where the reduced transmission power is applied during full-duplex communications using the first subset of wireless resources, transmit the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission, and transmit, to the first wireless device, a reduced transmission power identifier that indicates the first subset of the first set of wireless resources has the reduced transmission power relative to the nominal transmission power.

Another apparatus for wireless communication is described. The apparatus may include means for identifying, at a base station, a first set of wireless resources for a first transmission to a first wireless device, determining a nominal transmission power for the first transmission, receiving an indication that a second wireless device is to transmit to the base station using a first subset of the first set of wireless resources, determining a reduced transmission power relative to the nominal transmission power for a first portion of the first transmission to be transmitted in the first subset of wireless resources, where the reduced transmission power is applied during full-duplex communications using the first subset of wireless resources, transmitting the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission, and transmitting, to the first wireless device, a reduced transmission power identifier that indicates the first subset of the first set of wireless resources has the reduced transmission power relative to the nominal transmission power.

A non-transitory computer-readable medium storing code for wireless communication is described. The code may include instructions executable by a processor to identify, at a base station, a first set of wireless resources for a first transmission to a first wireless device, determine a nominal transmission power for the first transmission, receive an indication that a second wireless device is to transmit to the base station using a first subset of the first set of wireless resources, determine a reduced transmission power relative to the nominal transmission power for a first portion of the first transmission to be transmitted in the first subset of wireless resources, where the reduced transmission power is applied during full-duplex communications using the first subset of wireless resources, transmit the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission, and transmit, to the first wireless device, a reduced transmission power identifier that indicates the first subset of the first set of wireless resources has the reduced transmission power relative to the nominal transmission power.

In some examples of the method, apparatuses, and non-transitory computer-readable medium described herein, the determining the reduced transmission power may include operations, features, means, or instructions for determining a self-interference strength associated with the first transmission and the first subset of wireless resources, and determining an amount of reduction of the nominal transmission power that is needed to reduce the self-interference strength to be at or below a threshold value. In some examples of the method, apparatuses, and non-transitory computer-readable medium described herein, the self-interference strength is based on a half-duplex interference-plus-noise power measurement at the base station, or a coefficient product the half-duplex interference-plus-noise power measurement. In some examples of the method, apparatuses, and non-transitory computer-readable medium described herein, the reduced transmission power provides for reduced self-interference at the base station during full-duplex communications.

In some examples of the method, apparatuses, and non-transitory computer-readable medium described herein, the reduced transmission power identifier provides an indication of time resources, frequency resources, or combinations thereof, of the first subset of wireless resources, and an indication of an amount of power reduction relative to the nominal transmission power.

In some examples of the method, apparatuses, and non-transitory computer-readable medium described herein, the first wireless device is a UE that is served by the base station, and where the method further may include operations, features, means, or instructions for transmitting downlink control information to the UE that indicates a downlink grant with the first set of wireless resources. In some examples of the method, apparatuses, and non-transitory computer-readable medium described herein, the downlink control information further indicates wireless resources for data transfer with the nominal transmission power.

In some examples of the method, apparatuses, and non-transitory computer-readable medium described herein, the first wireless device is a parent IAB node and the base station is an IAB node, and where the method further may include operations, features, means, or instructions for receiving an uplink grant from the parent IAB node that indicates the first set of wireless resources for data transfer from the IAB node to the parent IAB node. In some examples of the method, apparatuses, and non-transitory computer-readable medium described herein, the uplink grant further indicates wireless resources for data transfer with the nominal transmission power.

Some examples of the method, apparatuses, and non-transitory computer-readable medium described herein may further include operations, features, means, or instructions for transmitting, to the first wireless device, a transmit power reduction value for the first subset of wireless resources. In some examples of the method, apparatuses, and non-transitory computer-readable medium described herein, the transmit power reduction value is transmitted together with the reduced transmission power identifier or separately from the reduced transmission power identifier. In some examples of the method, apparatuses, and non-transitory computer-readable medium described herein, the transmit power reduction value is transmitted in a RRC message, in a MAC control element, in a physical layer message, or any combinations thereof.

In some examples of the method, apparatuses, and non-transitory computer-readable medium described herein, the transmit power reduction value is a static value provided in a system information transmission from the base station that is applied to multiple different wireless devices that receive transmissions from the base station. In some examples of the method, apparatuses, and non-transitory computer-readable medium described herein, the transmit power reduction value is transmitted in a dedicated message to the first wireless device, and where the dedicated message is transmitted in a different subset of wireless resources than the first subset of wireless resources or a different set of wireless resources than the first set of wireless resources.

In some examples of the method, apparatuses, and non-transitory computer-readable medium described herein, the transmit power reduction value is a dynamic value transmitted in a control information transmission from the base station that is associated with the first set of wireless resources. In some examples of the method, apparatuses, and non-transitory computer-readable medium described herein, the control information transmission is a common downlink control information transmission or a dedicated control information transmission to the first wireless device.

Some examples of the method, apparatuses, and non-transitory computer-readable medium described herein may further include operations, features, means, or instructions for transmitting, to the first wireless device, a bitmap that indicates time-frequency resources of the first subset of wireless resources. In some examples of the method, apparatuses, and non-transitory computer-readable medium described herein, the first set of wireless resources is divided into a set of parts of time-frequency dimensions, and where each element of the bitmap is associated with a different part of the set of parts of time-frequency dimensions. In some examples of the method, apparatuses, and non-transitory computer-readable medium described herein, the first set of wireless resources is divided into a set of blocks of time-frequency resources, each block of time-frequency resources having a time-domain start position and length and a frequency-domain start position and length, and where the first subset of wireless resources is indicated by an identification of one or the set of blocks of time-frequency resources.

Some examples of the method, apparatuses, and non-transitory computer-readable medium described herein may further include operations, features, means, or instructions for transmitting, to the first wireless device, a joint indication of the first subset of wireless resources and a transmit power reduction value for the first subset of wireless resources. In some examples of the method, apparatuses, and non-transitory computer-readable medium described herein, the first set of wireless resources is divided into a set of parts of time-frequency dimensions and the joint indication includes a bitmap, where a first segment of bits of the bitmap indicates a first transmit power reduction value for a first part of time-frequency dimensions, and a second segment of bits of the bitmap indicates a second transmit power reduction value for a second part of time-frequency dimensions.

BRIEF DESCRIPTION OF THE DRAWINGS

FIGS. 16 through 22 show flowcharts illustrating methods that support full-duplex techniques in wireless communications in accordance with aspects of the present disclosure.

DETAILED DESCRIPTION

Figure 1:
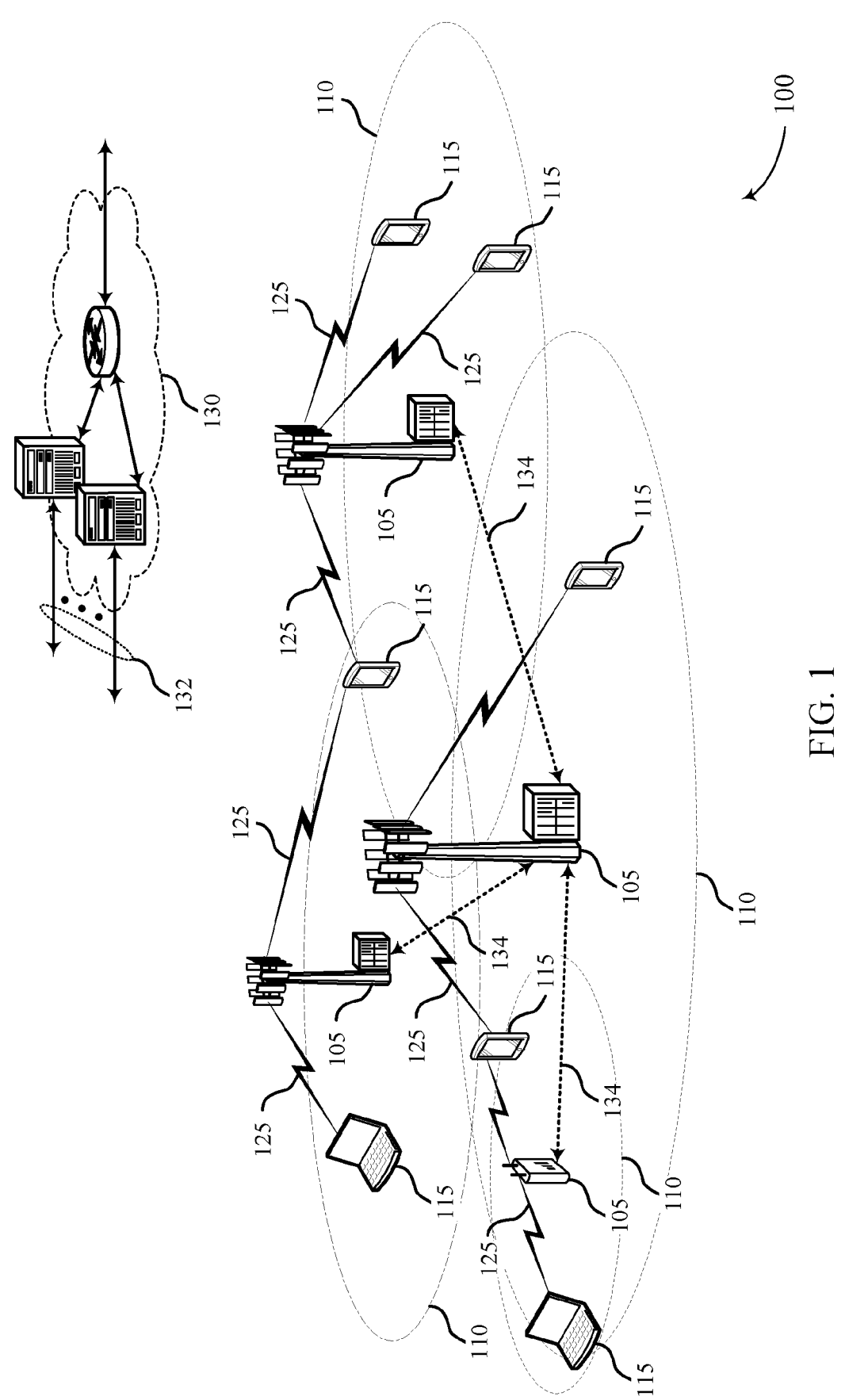
FIG. 1 illustrates an example of a system for wireless communications that supports full-duplex techniques in wireless communications in accordance with aspects of the present disclosure.

In some wireless communications systems, a base station, or other wireless communications device, may provide a full-duplex capability, where the base station is capable of concurrent transmission and reception using resources that at least partially overlap in both time and frequency. However, the concurrent transmission and reception may result in a self-interference that impacts the reception, due to some energy from the transmission being received along with the reception signal. Various aspects of the present disclosure provide for mitigation of self-interference through reduced transmission power on wireless resources in which concurrent transmission and reception is to occur.

In some traditional systems, if a base station has allocated a set of resources for downlink transmissions from the base station to a first use equipment (UE), and receives an indication of a high-priority uplink transmission from a second UE that is to be transmitted using at least partially overlapping time-frequency resources of the set of resources, the high-priority uplink transmission may preempt downlink transmissions for the overlapping time-frequency resources. In such cases, the base station may discontinue the downlink transmissions in favor of the higher priority uplink reception from the second UE. Such preemption usually results in the first UE not being able to successfully demodulate and decode the downlink transmission of the allocated set of resources, and requesting a retransmission of the downlink transmission. According to various aspects as discussed herein, the base station may continue to transmit the downlink communication to the first UE in the overlapping resources, but at a reduced power. The first UE may be able to receive and decode the downlink communication in such cases, and if successful decoding is not achieved, may buffer the downlink transmission to be combined with a subsequent retransmission, which may enhance the likelihood of successful decoding of the downlink transmission. Techniques as discussed herein may be used for access links between a base station and multiple UEs, for integrated access and backhaul (IAB) links between parent/child IAB nodes, or combinations thereof.

As described herein, various techniques provide that the base station, upon transmitting at a reduced power for a subset of a set of allocated resources, may provide an indication of the power reduction. In some cases, the base station may provide an indication of the subset of resources in signaling to the wireless device that is to receive the transmission. In some cases, the indication may provide an amount of power reduction that is applied at the base station. The indication may be provided, in some cases, subsequent to the reduced power transmission, and may be used at the receiving wireless device during demodulation and decoding of the transmission from the base station. In some cases, the base station may provide an access link to a UE and the indication may be provided in a downlink control information (DCI) transmission to the UE, in a medium access control (MAC) control element (CE) transmitted to the UE, or combinations thereof. In some cases, the base station may be an IAB node and the indication may be provided in uplink control information (UCI) transmitted to a parent IAB node, in a MAC-CE transmitted to the parent IAB node, or combinations thereof.

In some cases, the indication may be provided in a bitmap that identifies the particular subset of resources impacted. In some cases, the bitmap may also provide an indication of an amount of power reduction applied. Additionally or alternatively, one or more amounts of power reduction may be provided in other signaling, such as radio resource control (RRC) signaling, and the amount of the power reduction may be determined based thereon. In some cases, multiple levels of power reduction may be configured, and information may be included with the bitmap that indicates which of the multiple levels of power reduction is applied to the reduced power transmission.

Such techniques may allow for mitigation of self-interference at a full-duplex base station, which may enhance throughput and reliability for full-duplex communications, while also allowing concurrent transmission to a receiving device rather than preemption of the concurrent transmission. The receiving device may receive the transmission based on an indication of the reduced transmission power and may successfully decode the transmission or combine with a retransmission. Thus, techniques as provided herein further provide for enhanced throughput and reliability for receiving devices that receive the reduced power transmissions.

Aspects of the disclosure are initially described in the context of exemplary wireless communications systems. Aspects of the disclosure are further illustrated by and described with reference to apparatus diagrams, system diagrams, process flows, and flowcharts that relate to full-duplex techniques in wireless communications.

FIG. 1 illustrates an example of a wireless communications system 100 that supports full-duplex techniques in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some wireless communications systems (e.g., next generation wireless networks, 5G networks, NR, etc.), ultra-high data rates and a wide scope of application scenarios may be expected to be supported. Accordingly, wireless full-duplex (FD) communications is an emerging technique and may be capable of doubling the link capacity that can accommodate the ultra-high data rates and wide scope of application scenarios. The main idea behind wireless full-duplex may include enabling radio network nodes to transmit and receive simultaneously on a same frequency band and at a same time slot. This simultaneous communication using the same frequency band at the same time may contrast with conventional operations (e.g., half duplex operation, non-full-duplex operations, etc.) where transmission and reception either differ in time and/or in frequency. A full-duplex network node, such as a base station 105 in a cellular network, may communicate simultaneously in uplink and downlink with two half-duplex terminals (e.g., half-duplex UEs 115) using the same radio resources (e.g., same time-frequency resources). Another wireless full-duplex application scenario may include one relay node (e.g., an IAB node) that can communicate simultaneously with an anchor node (e.g., an IAB parent node) and a child node (e.g., a UE 115 or IAB child node) in a one-hop scenario or with two other relay nodes in a multi-hop scenario. It is expected that by doubling each single-link capacity, full-duplexing may increase the system throughput in diverse applications in wireless communication networks and also reduce a transfer latency for time sensitive services.

According to various aspects of the present disclosure, a base station 105 operating in full-duplex mode may provide for reception of one or more higher priority transmissions using at least partially overlapping time-frequency resources as used for transmission of lower priority communications. In such cases, in order to mitigate self-interference at the base station 105, a transmission power used for the overlapping time-frequency resources may be reduced. In some cases, the base station 105 may provide an indication of a subset of resources that have a reduced transmission power, an amount of the power reduction for the subset of resources, or both.

Figure 2:
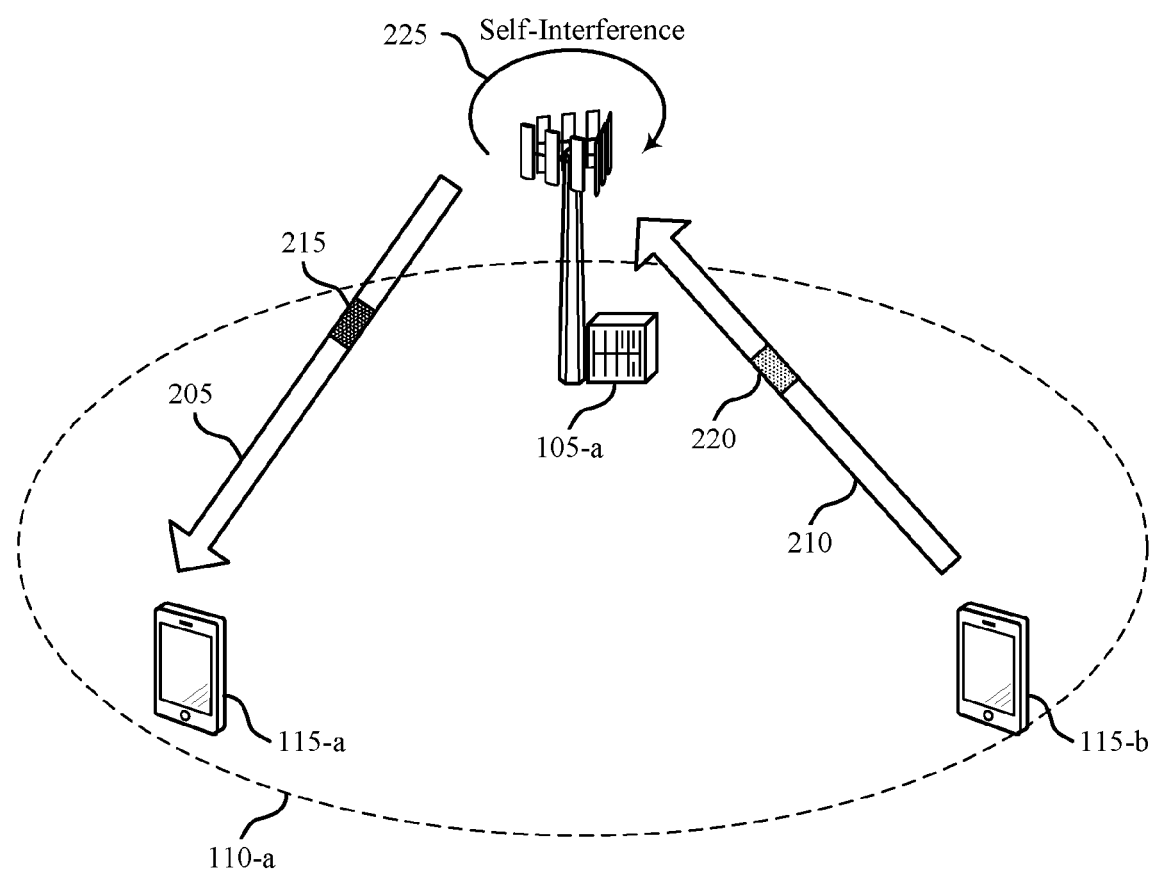
FIG. 2 illustrates an example of a wireless communications system that supports full-duplex techniques in wireless communications in accordance with aspects of the present disclosure.

FIG. 2 illustrates an example of a wireless communications system 200 that supports full-duplex techniques in wireless communications in accordance with aspects of the present disclosure. In some examples, wireless communications system 200 may implement aspects of wireless communications system 100. Wireless communications system 200 may include a base station 105-a, a first UE 115-a, and a second UE 115-b, which may be in a coverage area 110-a of the base station 105-a. The base station 105-a and UEs 115 may be examples of corresponding devices as described above with reference to FIG. 1.

In some cases, base station 105-a may transmit downlink communications 205 to the first UE 115-a. The downlink communications 205 may include downlink communication resources 215, which may be allocated downlink resources provided to the first UE 115-a by the base station 105-a (e.g., in DCI). In the example of FIG. 2, the second UE 115-b may transmit uplink communications 210 to the base station 105-a. The uplink communications 210 may include a URLLC transmission 220 that may have a higher priority than downlink communications 205 transmitted using the downlink communication resources 215. In some cases, the URLLC transmission 220 may use at least partially overlapping time-frequency resources as the downlink communication resources 215.

In this example, the base station 105-a may be a full-duplex-capable base station 105-a as described above with reference to FIG. 1, where the base station 105-a is capable of simultaneously transmitting using the downlink communications resources 215 and receiving the URLLC transmission 220 using at least partially overlapping time-frequency resources (e.g., using a subset of time-frequency resources of the downlink communications resources 215). Thus, in some cases, the base station 105-a may be subject to self-interference 225 from concurrent uplink communications 210 and downlink communications 205, specifically, the direction of self-interference 225 is from uplink communications 210 to downlink communications 205.

As described herein, to mitigate self-interference at the base station 105-a that results from the full-duplex capability and the downlink transmission interfering with reception of uplink transmissions, base station 105-a may reduce a transmission power in a subset of the downlink communication resources 215 that overlap with URLLC transmission 220. In some cases, the base station 105-a may suppress self-interference using one or more interference canceling techniques. For example, the base station 105-a may mitigate self-interference by combining the technologies of one or more of beamforming, analog cancellation, digital cancellation, or antenna cancellation. However, in cases where the transmit power of the downlink communication resources 215 is relatively large, there may still exist a certain degree of remaining self-interference strength after cancellation, which may impair the reception performance of the URLLC transmission 220 (e.g., due to certain parts of the signal energy that may leak to adjacent frequency bands, which causes self-interference at these adjacent frequency bands).

As indicated above, in some existing systems, URLLC transmissions 220 may preempt downlink transmissions 205 in the associated downlink communication resources 215 that overlap with time-frequency resources of the URLLC transmission 220. In cases where preemption is used, the base station 105-a may transmit a preemption indication. For example, if an uplink URLLC transmission 220 interrupts an eMBB downlink transmission, the preemption may be indicated to the first UE 115-a in a Group-Common DCI (GC-DCI), to be monitored by the first UE 115-a using an INT-RNTI (interruption-Radio Network Temporary Identifier) which is configured by RRC message. In some cases, such a preemption indication may include a {M,N} bitmap, representing M time-domain parts and N frequency-domain parts regarding the last GC-DCI periodicity, of overall 14-bits (e.g., {M,N}={14,1} for 14 symbol groups and 1 PRB group per symbol group, Or {M,N}={7,2} for 7 symbol groups and 2 PRB groups per symbol group). In some cases, when the base station 105-a uses a reduced transmission power, the indication of wireless resources with the reduced transmission power may use similar signaling, as will be discussed in more detail with reference to FIG. 3.

Thus, according to various aspects discussed herein, rather than preempting a downlink transmission, which may result in decreased throughput and increased transmit latency due to additional retransmissions, the full-duplex base station 105-a may use full-duplex communications. The base station 105-a may mitigate the self-interference from downlink communications 205 to the received URLLC transmission 220 based on one or more interference cancellation techniques and based on a on reduced transmit power. The first UE 115-a may combine the demodulation results of normal-power part and reduced-power part of the downlink communication resources 215 in one or more HARQ (re) transmissions before decoding, if the UE 115-a is not able to decode the initial transmission. This can improve decoding performance at the first UE 115-a, while reducing the latency for URLLC service of the second UE 115-b.

Figure 3:
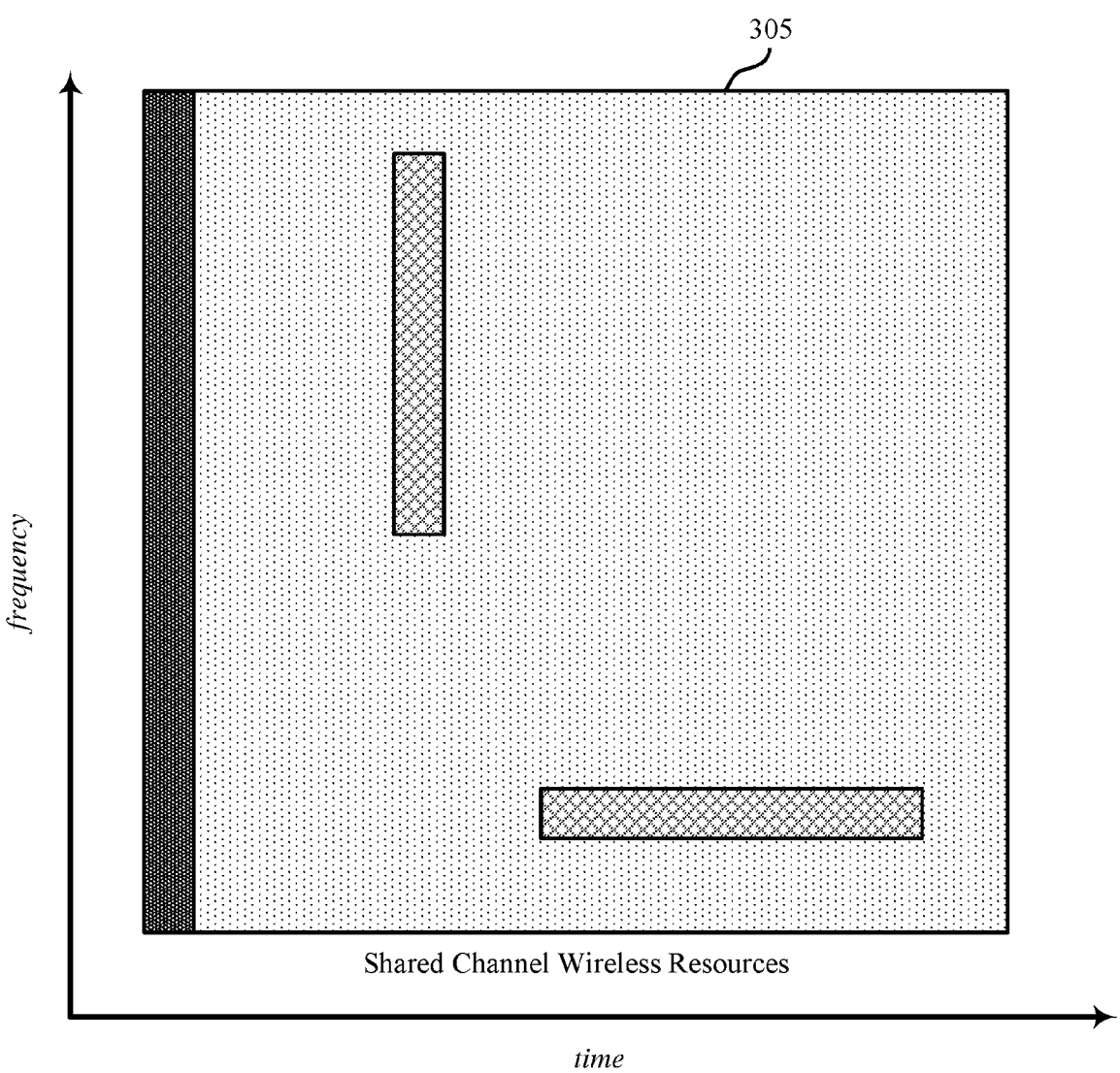
FIG. 3 illustrates an example of wireless resources that support full-duplex techniques in wireless communications in accordance with aspects of the present disclosure.

FIG. 3 illustrates an example of wireless resources 300 that support full-duplex techniques in wireless communications in accordance with aspects of the present disclosure. In some examples, wireless resources 300 may implement aspects of wireless communications system 100 or 200. In this example, a set of resources 305 may be allocated for transmissions of a base station. For example, the set of resources 305 may be downlink resources allocated to a downlink UE (e.g., a first UE as illustrated in FIG. 2). In other cases, the base station may be an IAB node and the set of resources 305 may be uplink resources allocated for uplink transmissions from the base station to a parent IAB node.

The set of resources 305, in this example, may include a number of OFDM symbols in the time domain and a number of subcarriers in the frequency domain. The set of resources 305 may include resources for a demodulation reference signal (DMRS) 310, which may be transmitted by the base station to aid in demodulation of transmissions that use the set of resources 305 at a receiving device. For example, a predefined DMRS pattern may be transmitted that may be used at the receiving device to perform channel estimation and to demodulate other transmissions of the set of resources 305. In this example, transmissions using the set of resources 305 may include transmissions at nominal power using nominal power resources 315, and one or more reduced power transmissions using reduced power resources 320.

For example, in an access system where the set of resources 305 provide downlink resources for downlink transmissions from the base station to a UE, the base station may transmit a downlink grant to the downlink UE to assign the set of resources 305 for data transfer. The base station may then transmit downlink data in the set of resources 305. In the event that the base station receives an indication that a higher priority uplink transmission (e.g., a URLLC transmission) is to be transmitted using a portion of the set of resources 305, the base station may identify the portion of the set of resources as a subset of resources that are reduced power resources 320 in which a downlink transmit power is reduced for the downlink communications. In the example, of FIG. 3, two subsets of reduced power resources 320 are illustrated, with the understanding that more or fewer subsets of reduced power resources 320 may be present. These resource parts may be used by one or more uplink UEs to transfer URLLC service data in uplink transmissions, and thus the downlink transmissions and uplink receptions at the base station are in full duplex mode.

In various examples, the base station may transmit an indication of the reduced power resources 320 to the downlink UE. In some cases, the indication of the reduced power resources may provide time-frequency resource positions of the transmit power reduction and the transmit power reduction value. The downlink UE may then use this indication to improve reception performance of data transfer in downlink communications (e.g., the downlink UE may combine the demodulation results of the nominal power resources 315 and reduced power resources 320).

The base station, in some cases, may determine the transmit power reduction value for the reduced power resources 320, or the transmit power reduction value may be a predetermined power backoff. In cases where the base station determines the power reduction, such a determination may be based on an amount of self-interference at the base station that is present from the downlink transmissions of the base station. For example, in order to help guarantee the reception performance of a URLLC data packet and quality of service (QoS) of the associated URLLC service, the base station may reduce its transmit power to provide that a residual self-interference strength is not larger than a pre-configured threshold, the half-duplex interference-plus-noise power, a coefficient product the half-duplex interference-plus-noise power, or any combinations thereof. In some cases, the transmit power reduction value may be common to multiple UEs served by the base station, may be dedicated to each individual UE, or may depend on the situation of the URLLC service (e.g., the associated QoS, a signal strength of the uplink transmission, a modulation or coding scheme of the uplink transmission, etc.). While various examples discussed with reference to FIG. 3 are with respect to a base station that provides access links to UEs, these techniques may be applied equally in cases where the base station is an IAB node that provides backhaul links in an IAB network (alternatively or in addition to providing one or more access links).

In some cases, the base station may transmit an indication of the reduced transmission power to the downlink UE that indicates a transmit power reduction value and positions of a subset of resources with the transmit power reduction. The transmit power reduction value may be indicated together with or separate from the indication of the time-frequency resource positions of one or more subsets of resources that make up the reduced power resources 320. The transmit power reduction value may be indicated, for example, by RRC message(s), MAC-CE transmission(s), or PHY message(s). In some cases, the base station may configure one or more downlink UEs with a static indication of a power reduction value by one or more higher-layer messages (e.g., RRC messages). In some cases, such signaling may be provided with system information (e.g., in a system information block (SIB)) which is common to multiple UEs served by the base station. Additionally or alternatively, the base station may transmit RRC messages dedicated to one specific UE. In some cases, such RRC messages may be conveyed by a different HARQ process from the one that conveys the data transfer with transmission power reduction. In other cases, the power reduction value may be provided in a semi-static indication using one or more MAC-layer messages (e.g., a MAC-CE). Such MAC-CE messages also may be conveyed by a different HARQ process from the one that conveys the data transfer with transmission power reduction. In further cases, the indication of power reduction may be provided in a dynamic indication by physical-layer message (e.g., DCI (in downlink) or UCI (in uplink for a parent backhaul link)). In some cases, such DCI may be provided in a group-common DCI, which is common to multiple UEs served by the base station. In other cases, the DCI may be a UE-specific DCI, which is dedicated to one specific UE.

In some cases, the time-frequency resource positions of the reduced power resources 320 may be represented by a bitmap in time-frequency dimensions, by the start position and length, or by a start position and end position. In some cases, if the entire set of downlink resources 305 for data transfer is divided into N parts in time-frequency dimensions, one bin of a N-length bitmap may represent whether or not its corresponding downlink resource part has normal or reduced transmit power.

In other cases, the set of downlink resources 305 may be partitioned into M blocks of time-frequency resources where transmit power is reduced, each block is represented by a start position and a length/end-position in time-domain and a start position and a length/end-position in frequency-domain. In some cases, it may be set that the unit in the frequency-domain is the whole bandwidth of set of down-link resources 305 (e.g., BWP or cell bandwidth), and thus the start position and the length/end-position in frequency-domain is not needed in such cases. The transmit power reduction value and the positions of transmit power reduction area may, in some cases, be indicated jointly. For example, $2^n$ transmit power levels may be configured (e.g., by RRC or MAC messages), and the set of resources 305 for data transfer may be divided into N parts in time-frequency dimensions, and then n bits may be used to represent one of the $2^n$ transmit power levels in the corresponding reduced power resource 320 or each of the N parts of the set of resources 305.

After the downlink UE (in a BS-UE system) or parent IAB node (in an IAB system) receives the indication of the time-frequency resource positions of transmit power reduction and the transmit power reduction value, it can first perform channel estimation and demodulation for the received signal at the indicated time-frequency resource positions, based on the indicated transmit power reduction value. In cases where the resource part with transmission power reduction contains DMRS 310, then the channel estimation can rely on this reduced-power DMRS. In cases where the resource part with transmission power reduction does not contain DMRS 310, then the channel estimation can rely on the normal-power DMRS 310 outside of this resource part to generate the channel gain, and then the channel gain at this resource part may be calculated by multiplying the generated channel gain with the transmission power reduction value. Then, the receiver may perform combining of the demodulated results derived from the normal-power part and reduced-power part, and perform decoding of the combined demodulation results. In some cases, the receiver can decode successfully by utilizing the demodulated results which are received prior to the indication. In other cases, the receiver may not successfully decode the transmission by utilizing the demodulated results which are received prior to the indication. Then, the receiver may invoke the HARQ retransmission for this HARQ process, and combine all the demodulated results, including the ones from normal-power resource part and the ones from reduced-power resource part.

Figure 4:
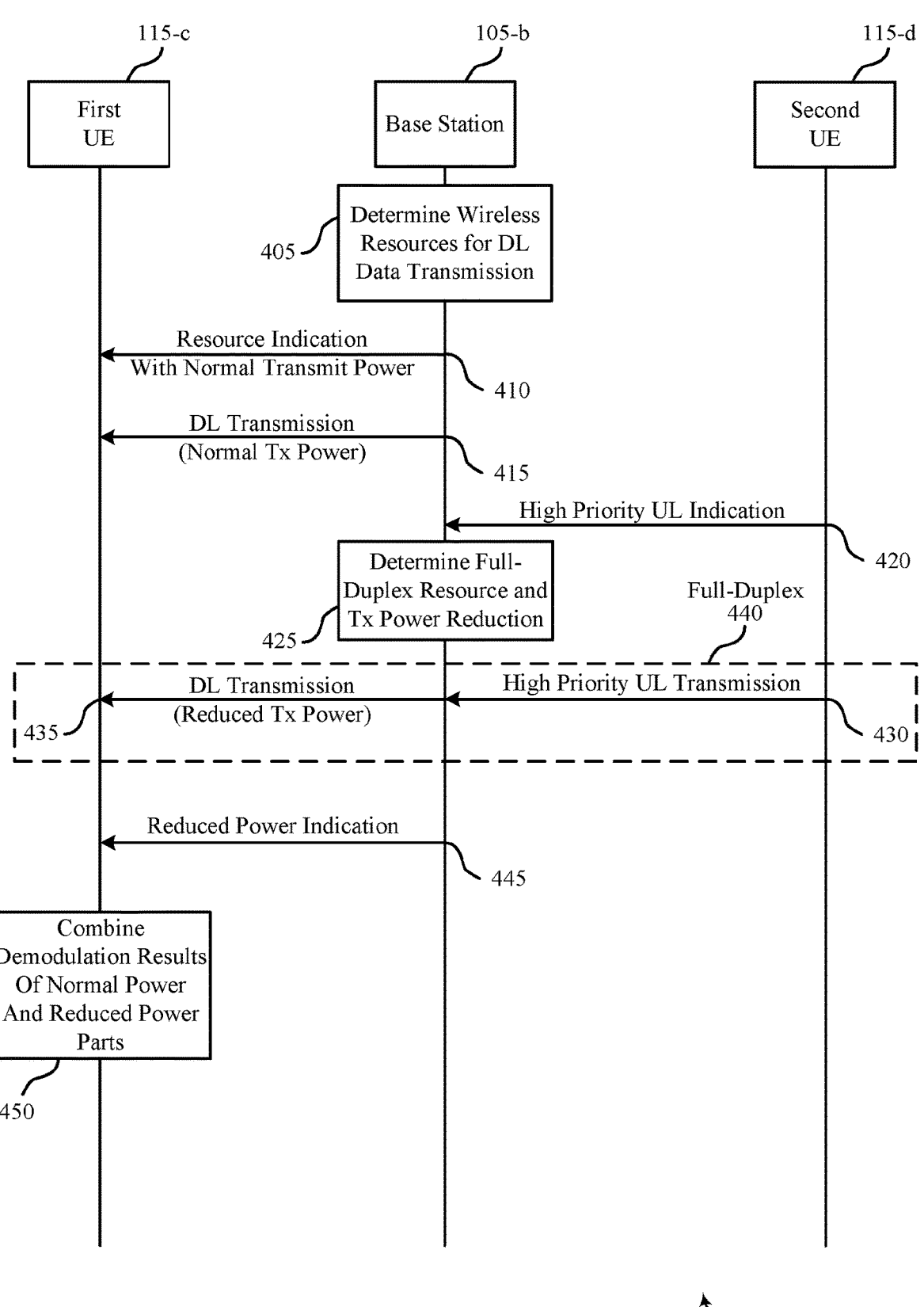
FIG. 4 illustrates an example of a process flow that supports full-duplex techniques in wireless communications in accordance with aspects of the present disclosure.

FIG. 4 illustrates an example of a process flow 400 that supports full-duplex techniques in wireless communications in accordance with aspects of the present disclosure. In some examples, process flow 400 may implement aspects of wireless communications system 100 or 200. Process flow 400 may include a base station 105-*b*, a first UE 115-*c*, and a second UE 115-*d*, which may be examples of corresponding base stations 105 and UEs 115, respectively, as described above with reference to FIGS. 1-3. As described herein, the base station 105-*b* may be a full-duplex base station as described above.

In the following description of the process flow 400, the operations between UEs 115 and base station 105-*b* may be transmitted in a different order than the order shown, or the operations performed by base station 105-*b* and UEs 115 may be performed in different orders or at different times. Certain operations may also be left out of the process flow 400, or other operations may be added to the process flow 400. It is to be understood that while base station 105-*b* and UEs 115 are shown performing a number of the operations of process flow 400, any wireless device may perform the operations shown.

In this example, the base station 105-*b* provides access links for the first UE 115-*c* and the second UE 115-*d*. At 405, the base station 105-*b* may determine a set of wireless resources for downlink data transmissions to the first UE 115-c. In some cases, the set of wireless resources may be provided for a relatively low priority service (e.g., eMBB). At 410, the base station 105-b may transmit a resource indication with normal transmit power to the first UE 115-c. The resource indication may be provided, for example, in DCI to the first UE 115-c that indicates the set of downlink resources for downlink transmissions to the first UE 115-c. At 415, the base station 105-b may transmit downlink transmissions to the first UE 115-c at the normal transmission power for a first subset of the set of wireless resources.

At 420, the second UE 115-d may transmit a high priority uplink indication to the base station 105-b. For example, the second UE 115-d may be configured with a URLLC service, and URLLC data may become present at the second UE 115-d for transmission to the base station 105-b. At 425, the base station 105-b may receive the high priority uplink indication from the second UE 115-d and may determine a full-duplex resource and transmission power reduction associated with the full-duplex resource. In some cases, the base station 105-b may provide an indication of the determined resource to the second UE 115-d, and in other cases the second UE 115-d may autonomously transmit the high priority communication (e.g., based on preconfigured resources allocated as available for high priority communication).

At 430, the second UE 115-d may transmit the high priority uplink transmission to the base station 105-b. At 435, using the same time-frequency resources, the base station 105-b may transmit a downlink transmission at reduced transmit power to the first UE 115-c. Thus, at block 440, the base station 105-b is operating in full-duplex mode to concurrently transmit and receive communications using at least partially overlapping time-frequency resources.

At 445, the base station 105-b may transmit a reduced power indication to the first UE 115-c. The reduced power indication may provide an indication of the subset of resources that have reduced transmit power in the downlink communications, such as discussed with reference to FIG. 3. In some cases, the reduced power indication may also provide an indication of an amount of power reduction that is applied, such as also discussed with reference to FIG. 3. At 450, the first UE 115-c may combine demodulation results of the normal power and reduced power subsets of the set of resources, and attempt to decode the downlink transmission. In some cases, if the downlink transmission is not successfully decoded, the received signals may be buffered at the first UE 115-c and a feedback transmission (e.g., a HARQ negative acknowledgment transmission) may be provided to the base station 105-b to trigger a retransmission of the downlink transmission, which may be combined at the first UE 115-c to help enhance demodulation and decoding of the retransmission.

Figure 5:
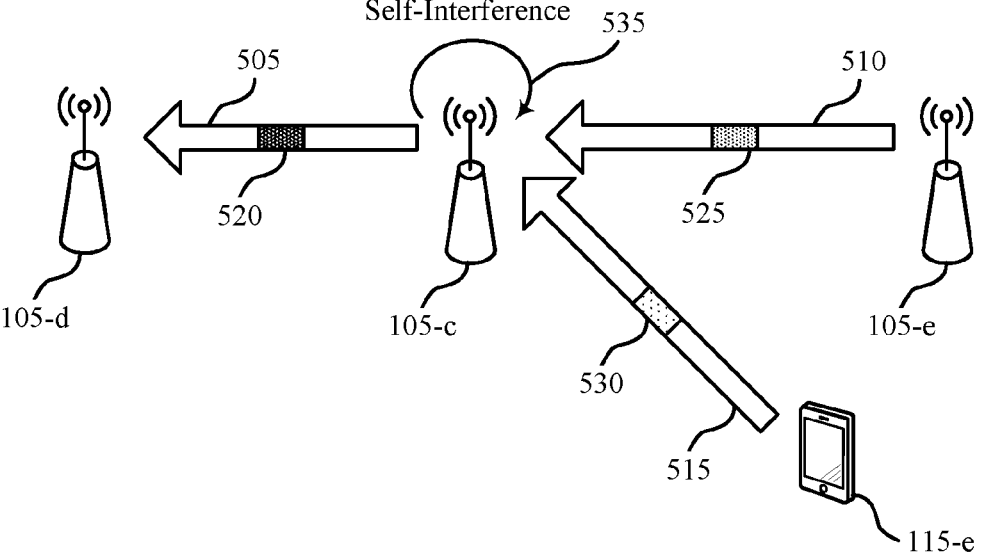
FIG. 5 illustrates an example of a wireless communications system that supports full-duplex techniques in wireless communications in accordance with aspects of the present disclosure.

As indicated above, techniques provided herein may be used for access links, as well as in other deployment scenarios, such as for backhaul links in an IAB system. FIG. 5 illustrates an example of an IAB wireless communications system 500 that supports full-duplex techniques in wireless communications in accordance with aspects of the present disclosure. In some examples, wireless communications system 500 may implement aspects of wireless communications system 100 or 200. Wireless communications system 500 may include a base station 105-c, which may be an IAB node, a parent IAB node 105-d, a child IAB node 105-e, and a UE 115-e. The base stations 105 and UE 115-e may be examples of corresponding devices as described above with reference to FIG. 1 or 2.

In some cases, base station 105-c may transmit uplink backhaul communications 505 to the parent IAB node 105-d. The uplink backhaul communications 505 may include uplink backhaul communication resources 520, which may be allocated uplink resources provided to the base station 105-c by the parent IAB node 105-d. In the example of FIG. 5, the child IAB node 105-e may transmit uplink backhaul communications 510 to the base station 105-c. The uplink backhaul communications 510 may include a backhaul URLLC transmission 525 that may have a higher priority than uplink backhaul communications 505 transmitted using the uplink backhaul communication resources 520. Further, in this example, the UE 115-e may transmit uplink access communications 515 to the base station 105-c. The uplink access communications 515 may include an access link URLLC transmission 530 that may have a higher priority than uplink backhaul communications 505 transmitted using the uplink backhaul communication resources 520. In some cases, one or more of the backhaul URLLC transmission 525 or the access link URLLC transmission 530 may use at least partially overlapping time-frequency resources as the uplink backhaul communication resources 520.

In this example, the base station 105-c may be a full-duplex-capable base station 105-c as described above with reference to FIGS. 1 through 3, where the base station 105-c is capable of simultaneously transmitting using the uplink backhaul communication resources 520 and receiving one or more of the backhaul URLLC transmission 525 or access link URLLC transmission 530 using at least partially overlapping time-frequency resources (e.g., using a subset of time-frequency resources of the uplink backhaul communication resources 520). Thus, in some cases, the base station 105-c may be subject to self-interference 535 from concurrent uplink backhaul communications 505, uplink backhaul communications 510, and uplink access communications 515, specifically, the direction of self-interference 535 is from uplink backhaul communications 505 to uplink backhaul communications 510 or uplink access communications 515.

As described herein, to mitigate self-interference at the base station 105-c that results from the full-duplex capability, base station 105-c may reduce a transmission power in a subset of the uplink backhaul communication resources 520 that overlap with resources of one or more of the backhaul URLLC transmission 525 or access link URLLC transmission 530. In some cases, the base station 105-c may suppress self-interference using techniques as discussed above with reference to FIGS. 2 and 3. Further, the base station 105—may provide an indication of the power reduction to the parent IAB node 105-d in a manner similar as discussed with reference to FIGS. 2 and 3.

For example, the parent IAB node 105-d may transmit an uplink grant to the base station 105-c to assign a certain time-frequency resources as the uplink backhaul communication resources 520. Upon detection of one or more of the backhaul URLLC transmission 525 or the access link URLLC transmission 530, the base station 105-c may transmit data in uplink backhaul communication resources 520 with reduced transmit power for one or more parts of the time-frequency resources, with these resource parts used by the child IAB node 105-e the UE 115-e, or both to transfer URLLC service data. In such events, the base station 105-c may transmit the indication to the parent IAB node 105-d, including the positions of the parts of time-frequency resources and the transmit power reduction value, in a manner such as discussed with reference to FIG. 3. The parent IAB node 105-*d* may use this indication to improve reception performance of the associated data transfer, in a manner such as discussed with reference to FIG. 3.

Figure 6:
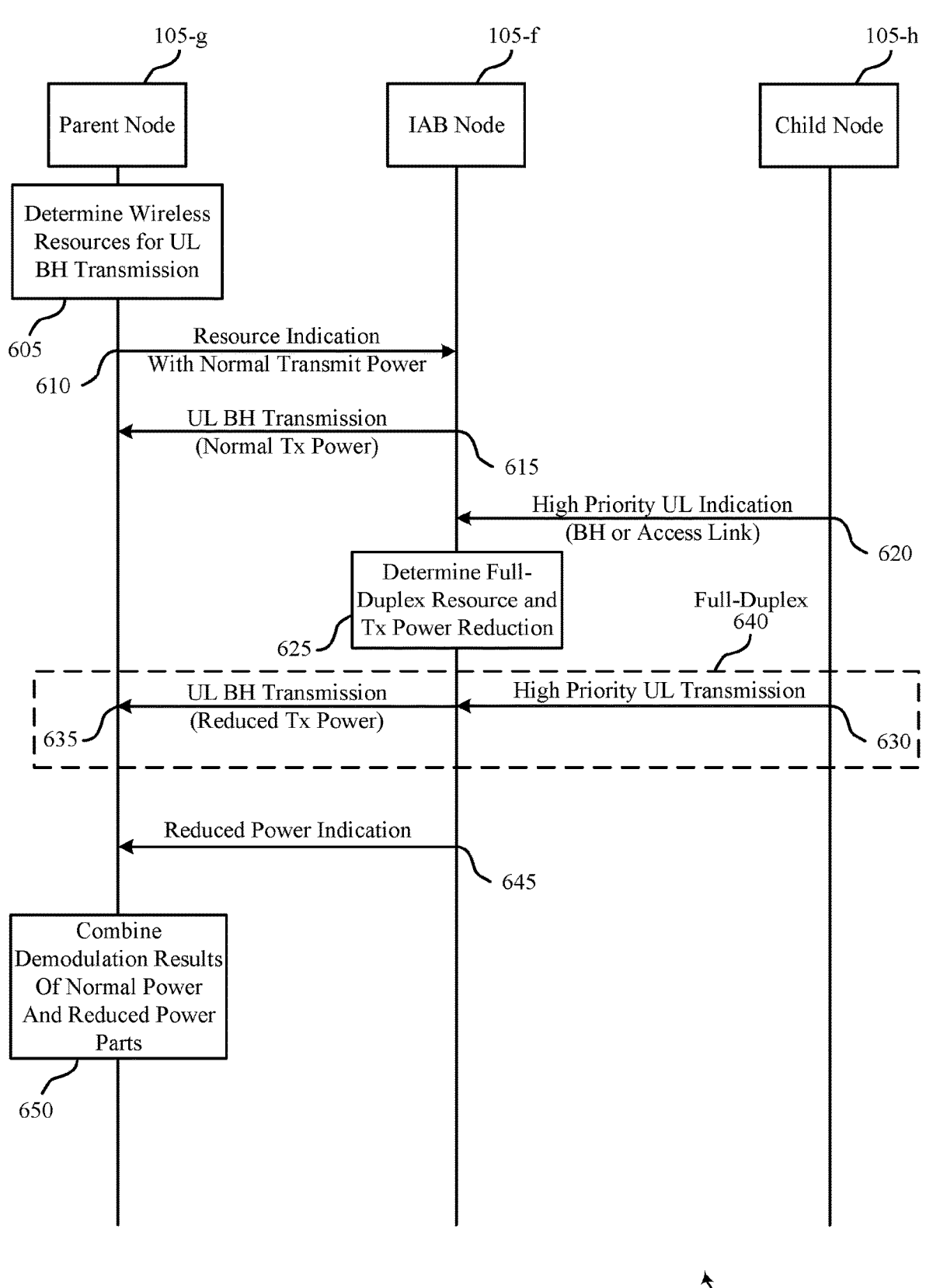
FIG. 6 illustrates an example of a process flow that supports full-duplex techniques in wireless communications in accordance with aspects of the present disclosure.

FIG. 6 illustrates an example of a process flow 600 that supports full-duplex techniques in wireless communications in accordance with aspects of the present disclosure. In some examples, process flow 600 may implement aspects of wireless communications system 100, 200, or 500. Process flow 600 may include a IAB node 105-*f*, a parent node 105-*g*, and a child node 105-*h*, which may be examples of base stations 105 as described above with reference to FIGS. 1-5. As described herein, the IAB node 105-*f* may be a full-duplex base station as described above. In some cases, the child node 105-*h* may be a UE that has an access link with the IAB node 105-*f*.

In the following description of the process flow 600, the operations between IAB node 105-*f*, parent node 105-*g*, and child node 105-*h* may be transmitted in a different order than the order shown, or the operations performed by IAB node 105-*f*, parent node 105-*g*, and child node 105-*h*, may be performed in different orders or at different times. Certain operations may also be left out of the process flow 600, or other operations may be added to the process flow 600. It is to be understood that while IAB node 105-*f*, parent node 105-*g*, and child node 105-*h*, are shown performing a number of the operations of process flow 600, any wireless device may perform the operations shown.

In this example, the IAB node 105-*f* may have backhaul links for the parent node 105-*g* and the child node 105-*h*. At 605, the parent node 105-*g* may determine a set of wireless resources for uplink backhaul data transmissions from the IAB node 105-*f* to the parent node 105-*g*. In some cases, the set of wireless resources may be provided for a relatively low priority service (e.g., eMBB). At 610, the parent node 105-*g* may transmit a resource indication with normal transmit power to the IAB node 105-*f*. The resource indication may be provided, for example, in DCI to the IAB node 105-*f* that indicates the set of uplink backhaul resources for uplink transmissions to the parent node 105-*g*. At 615, the IAB node 105-*f* may transmit uplink backhaul transmissions to the parent node 105-*g* at the normal transmission power for a first subset of the set of wireless resources.

At 620, the child node 105-*h* may transmit a high priority uplink indication to the IAB node 105-*f*. For example, the child node 105-*h* may be configured with a URLLC service, and URLLC data may become present at the child node 105-*h* for transmission to the IAB node 105-*f*. At 625, the IAB node 105-*f* may receive the high priority uplink indication from the child node 105-*h* and may determine a full-duplex resource and transmission power reduction associated with the full-duplex resource. In some cases, the IAB node 105-*f* may provide an indication of the determined resource to the child node 105-*h*, and in other cases the child node 105-*h* may autonomously transmit the high priority communication (e.g., based on preconfigured resources allocated as available for high priority communication).

At 630, the child node 105-*h* may transmit the high priority uplink transmission to the IAB node 105-*f*. At 635, using the same time-frequency resources, the IAB node 105-*f* may transmit an uplink backhaul transmission at reduced transmit power to the parent node 105-*g*. Thus, at block 640, the IAB node 105-*f* is operating in full-duplex mode to concurrently transmit and receive communications using at least partially overlapping time-frequency resources.

At 645, the IAB node 105-*f* may transmit a reduced power indication to the parent node 105-*g*. The reduced power indication may provide an indication of the subset of resources that have reduced transmit power in the uplink backhaul communications, such as discussed with reference to FIG. 3. In some cases, the reduced power indication may also provide an indication of an amount of power reduction that is applied, such as also discussed with reference to FIG. 3. At 650, the parent node 105-*g* may combine demodulation results of the normal power and reduced power subsets of the set of resources, and attempt to decode the uplink backhaul transmission. In some cases, if the uplink backhaul transmission is not successfully decoded, the received signals may be buffered at the parent node 105-*g* and a feedback transmission (e.g., a HARQ negative acknowledgment transmission) may be provided to the IAB node 105-*f* to trigger a retransmission of the uplink backhaul transmission, which may be combined at the parent node 105-*g* to help enhance demodulation and decoding of the retransmission.

Figure 7:
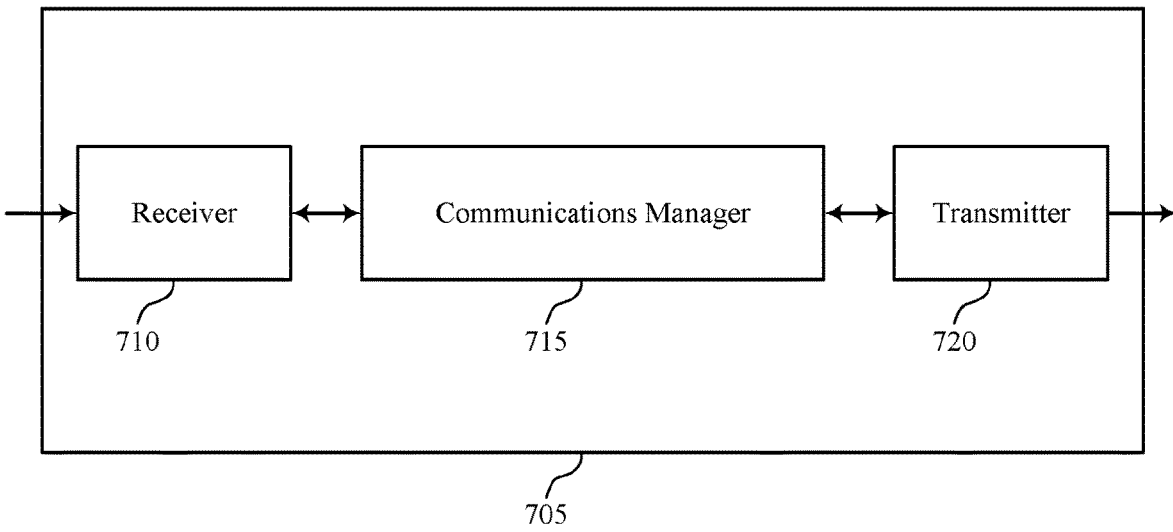
FIGS. 7 and 8 show block diagrams of devices that support full-duplex techniques in wireless communications in accordance with aspects of the present disclosure.

FIG. 7 shows a block diagram 700 of a device 705 that supports full-duplex techniques in wireless communications in accordance with aspects of the present disclosure. The device 705 may be an example of aspects of a UE 115 or base station 105 as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to full-duplex techniques in wireless communications, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The communications manager 715 may receive, at a first wireless device, a first transmission from a base station via a first set of wireless resources, where the first set of wireless resources has a nominal transmission power, receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station, demodulate signals received in the first subset of wireless resources based on the reduced transmission power identifier, and demodulate signals received in the second subset of wireless resources based on the nominal transmission power. The communications manager 715 may be an example of aspects of the communications manager 1010 or 1110 as described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

Figure 8:
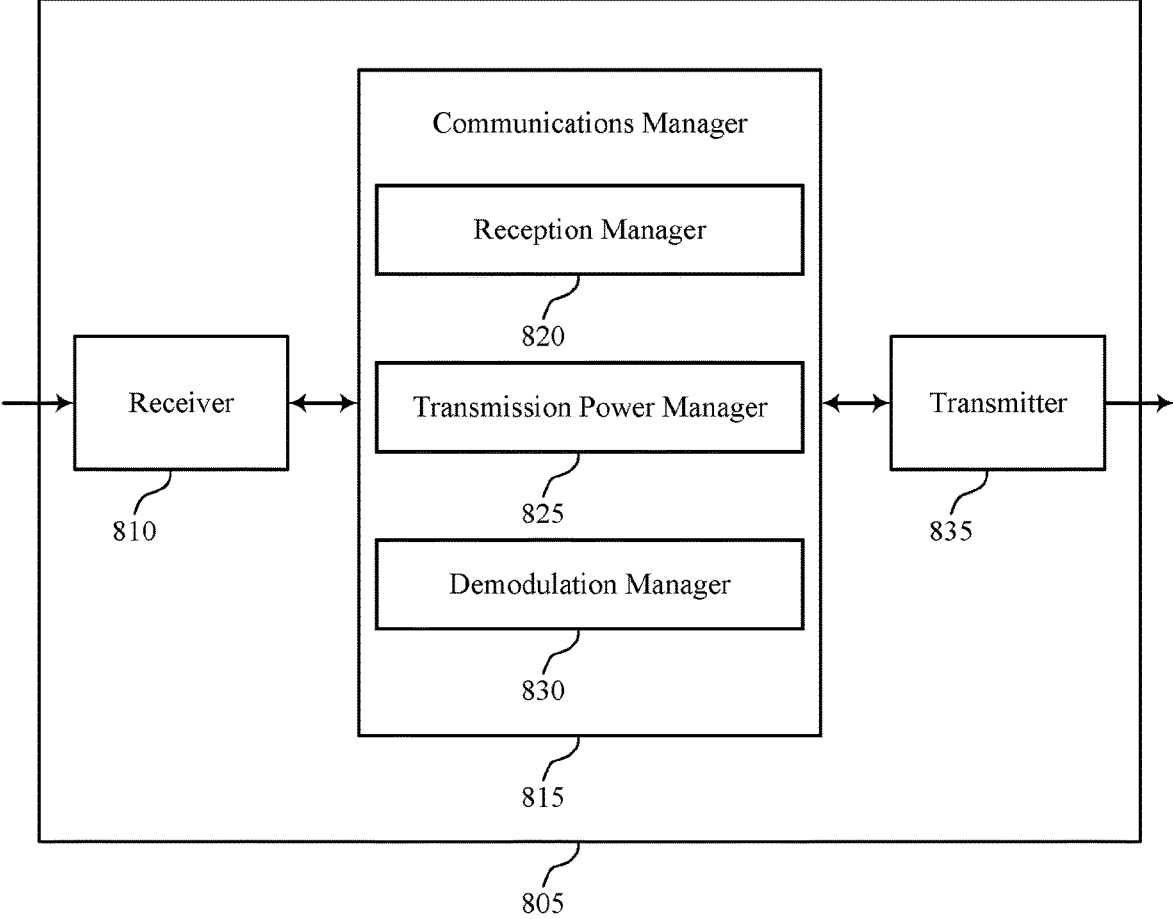

FIG. 8 shows a block diagram 800 of a device 805 that supports full-duplex techniques in wireless communications in accordance with aspects of the present disclosure. The device 805 may be an example of aspects of a device 705, a UE 115, or a base station 105 as described herein. The device 805 may include a receiver 810, a communications manager 815, and a transmitter 835. The device 805 may also include a processor. Each of these components may be in communication with one another (e.g., via one or more buses).

Receiver 810 may receive information such as packets, user data, or control information associated with various information channels (e.g., control channels, data channels, and information related to full-duplex techniques in wireless communications, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include a reception manager 820, a transmission power manager 825, and a demodulation manager 830. The communications manager 815 may be an example of aspects of the communications manager 1010 or 1110 as described herein.

The reception manager 820 may receive, at a first wireless device, a first transmission from a base station via a first set of wireless resources, where the first set of wireless resources has a nominal transmission power.

The transmission power manager 825 may receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station.

The demodulation manager 830 may demodulate signals received in the first subset of wireless resources based on the reduced transmission power identifier, and demodulate signals received in the second subset of wireless resources based on the nominal transmission power.

Transmitter 835 may transmit signals generated by other components of the device 805. In some examples, the transmitter 835 may be collocated with a receiver 810 in a transceiver module. For example, the transmitter 835 may be an example of aspects of the transceiver 1020 or 1120 as described with reference to FIGS. 10 and 11. The transmitter 835 may utilize a single antenna or a set of antennas.

Figure 9:
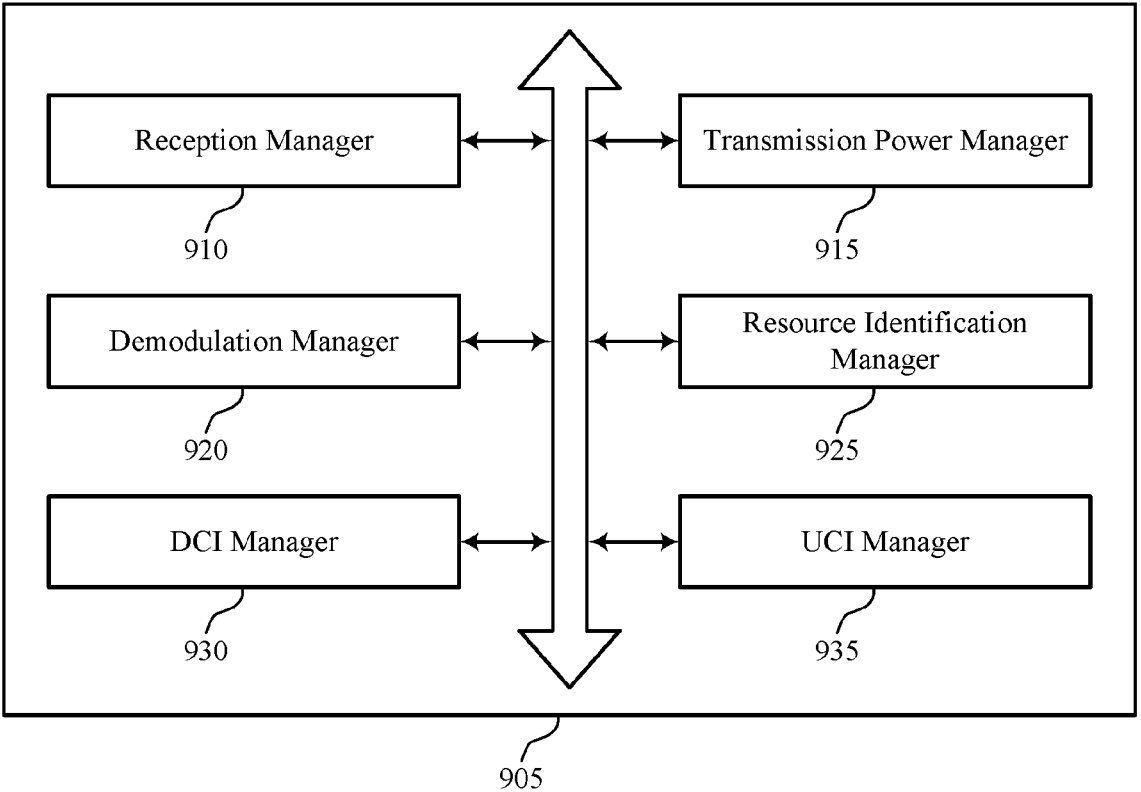
FIG. 9 shows a block diagram of a communications manager that supports full-duplex techniques in wireless communications in accordance with aspects of the present disclosure.

FIG. 9 shows a block diagram 900 of a communications manager 905 that supports full-duplex techniques in wireless communications in accordance with aspects of the present disclosure. The communications manager 905 may be an example of aspects of a communications manager 715, a communications manager 815, or a communications manager 1010 described herein. The communications manager 905 may include a reception manager 910, a transmission power manager 915, a demodulation manager 920, a resource identification manager 925, a DCI manager 930, and an UCI manager 935. Each of these modules may communicate, directly or indirectly, with one another (e.g., via one or more buses).

The reception manager 910 may receive, at a first wireless device, a first transmission from a base station via a first set of wireless resources, where the first set of wireless resources has a nominal transmission power. In some examples, the reception manager 910 may determine that the first transmission is not successfully decoded at the first wireless device. In some examples, the reception manager 910 may request a retransmission of the first transmission from the base station.

The transmission power manager 915 may receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station.

In some examples, the transmission power manager 915 may receive, from the base station, a transmit power reduction value for the first subset of wireless resources. In some cases, the reduced transmission power provides for reduced self-interference at the base station during full-duplex communications. In some cases, the transmit power reduction value is received together with the reduced transmission power identifier or separately from the reduced transmission power identifier. In some cases, the transmit power reduction value is received in a RRC message, in a medium access control (MAC) control element, in a physical layer message, or any combinations thereof. In some cases, the transmit power reduction value is a static value received in a system information transmission from the base station that is applied to multiple different wireless devices that receive transmissions from the base station.

In some cases, the transmit power reduction value is received in a dedicated message to the first wireless device, and where the dedicated message is received in a different subset of wireless resources than the first subset of wireless resources or a different set of wireless resources than the first set of wireless resources. In some cases, the transmit power reduction value is a dynamic value received in a control information transmission from the base station that is associated with the first set of wireless resources. In some cases, the control information transmission is a common control information transmission or a dedicated control information transmission to the first wireless device.

The demodulation manager 920 may demodulate signals received in the first subset of wireless resources based on the reduced transmission power identifier, and demodulate signals received in the second subset of wireless resources based on the nominal transmission power.

In some examples, the demodulation manager 920 may perform channel estimation and demodulation of signals received in the first subset of wireless resources based on the reduced transmission power identifier. In some examples, the demodulation manager 920 may perform channel estimation and demodulation of signals received in the second subset of wireless resources based on the nominal transmission power.

In some examples, the demodulation manager 920 may combine demodulated signals of the first subset of wireless resources and the second subset of wireless resources. In some examples, the demodulation manager 920 may decode the combined demodulated signals. In some examples, the demodulation manager 920 may demodulate a retransmission of the first transmission from the base station. In some examples, the demodulation manager 920 may combine the demodulated first transmission and the demodulated retransmission of the first transmission to generate a combined transmission. In some examples, the demodulation manager 920 may decode the combined transmission.

In some cases, the channel estimation and demodulation of the signals received in the first subset of wireless resources is based on a demodulation reference signal that is transmitted in the first subset of wireless resources. In some cases, the channel estimation and demodulation of the signals received in the first subset of wireless resources is based on a demodulation reference signal that is transmitted in the second subset of wireless resources, and where a channel gain of the second subset of wireless resources determined based on the demodulation reference signal is adjusted based on the reduced transmission power to obtain an adjusted channel gain associated with the first subset of wireless resources.

The resource identification manager 925 may receive, from the base station, a bitmap that indicates time-frequency resources of the first subset of wireless resources. In some examples, the resource identification manager 925 may receive, from the base station, a joint indication of the first subset of wireless resources and a transmit power reduction value for the first subset of wireless resources. In some cases, the reduced transmission power identifier provides an indication of time resources, frequency resources, or combinations thereof, of the first subset of wireless resources, and an indication of an amount of power reduction relative to the nominal transmission power. In some cases, the reduced transmission power identifier includes a radio network temporary identifier that is associated with the first wireless device and is transmitted by the base station in control information associated with the first transmission.

In some cases, the first set of wireless resources is divided into a set of parts of time-frequency dimensions, and where each element of the bitmap is associated with a different part of the set of parts of time-frequency dimensions. In some cases, the first set of wireless resources is divided into a set of blocks of time-frequency resources, each block of time-frequency resources having a time-domain start position and length and a frequency-domain start position and length, and where the first subset of wireless resources is indicated by an identification of one or more of the set of blocks of time-frequency resources. In some cases, the first set of wireless resources is divided into a set of parts of time-frequency dimensions and the joint indication includes a bitmap, where a first segment of bits of the bitmap indicates a first transmit power reduction value for a first part of time-frequency dimensions, and a second segment of bits of the bitmap indicates a second transmit power reduction value for a second part of time-frequency dimensions.

The DCI manager 930 may receive downlink control information from the base station that indicates a downlink grant with the first set of wireless resources. In some cases, the downlink control information further indicates wireless resources for data transfer with the nominal transmission power.

The UCI manager 935 may transmit an uplink grant to the base station that indicates the first set of wireless resources for data transfer from the IAB node to the parent IAB node. In some cases, the uplink grant further indicates wireless resources for data transfer with the nominal transmission power.

Figure 10:
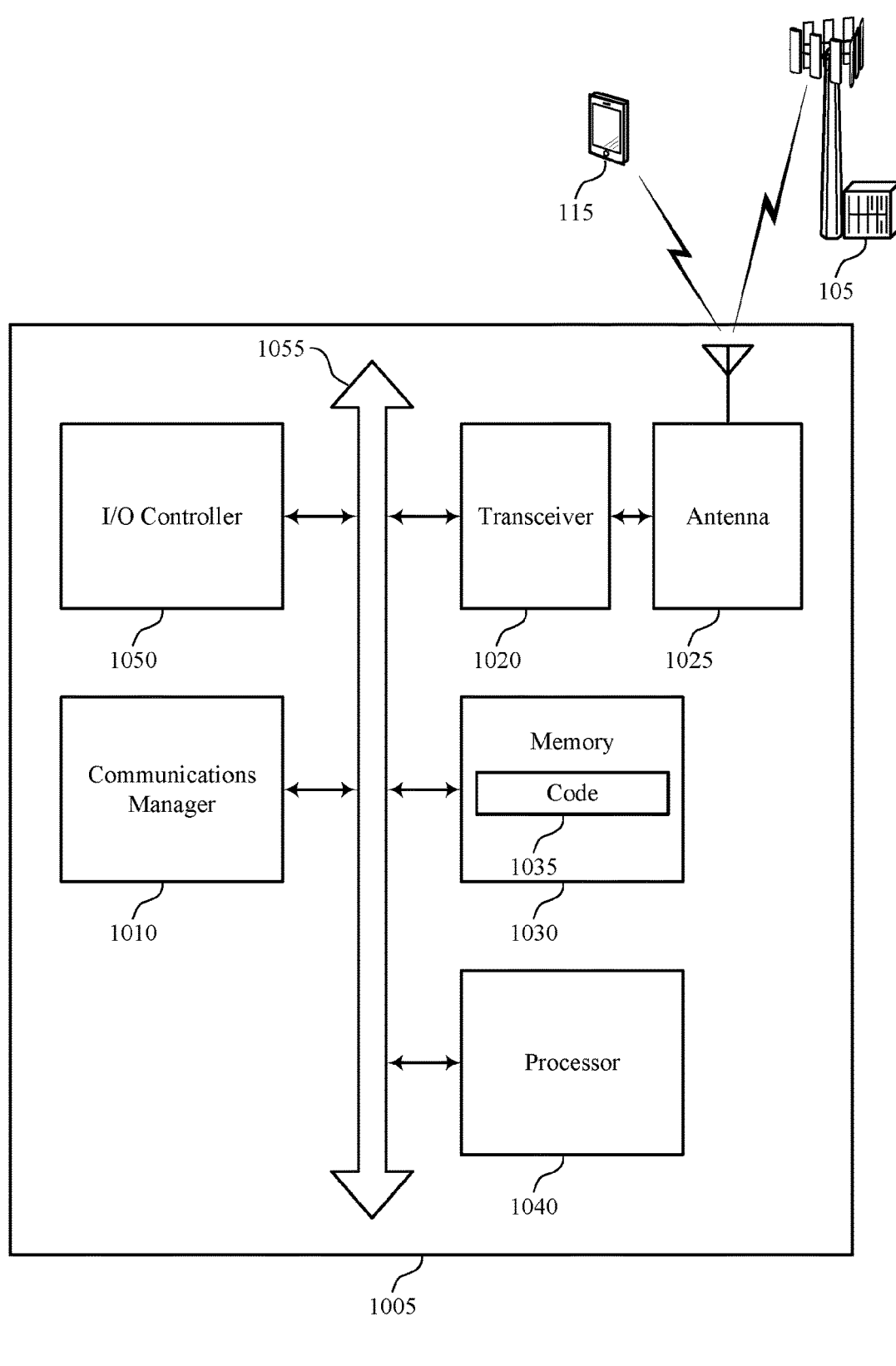
FIG. 10 shows a diagram of a system including a user equipment (UE) that supports full-duplex techniques in wireless communications in accordance with aspects of the present disclosure.

FIG. 10 shows a diagram of a system 1000 including a device 1005 that supports full-duplex techniques in wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be in electronic communication via one or more buses (e.g., bus 1055).

The communications manager 1010 may receive, at a first wireless device, a first transmission from a base station via a first set of wireless resources, where the first set of wireless resources has a nominal transmission power, receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station, and demodulate signals received in the first subset of wireless resources based on the reduced transmission power identifier, and demodulate signals received in the second subset of wireless resources based on the nominal transmission power.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting full-duplex techniques in wireless communications).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WIN-DOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
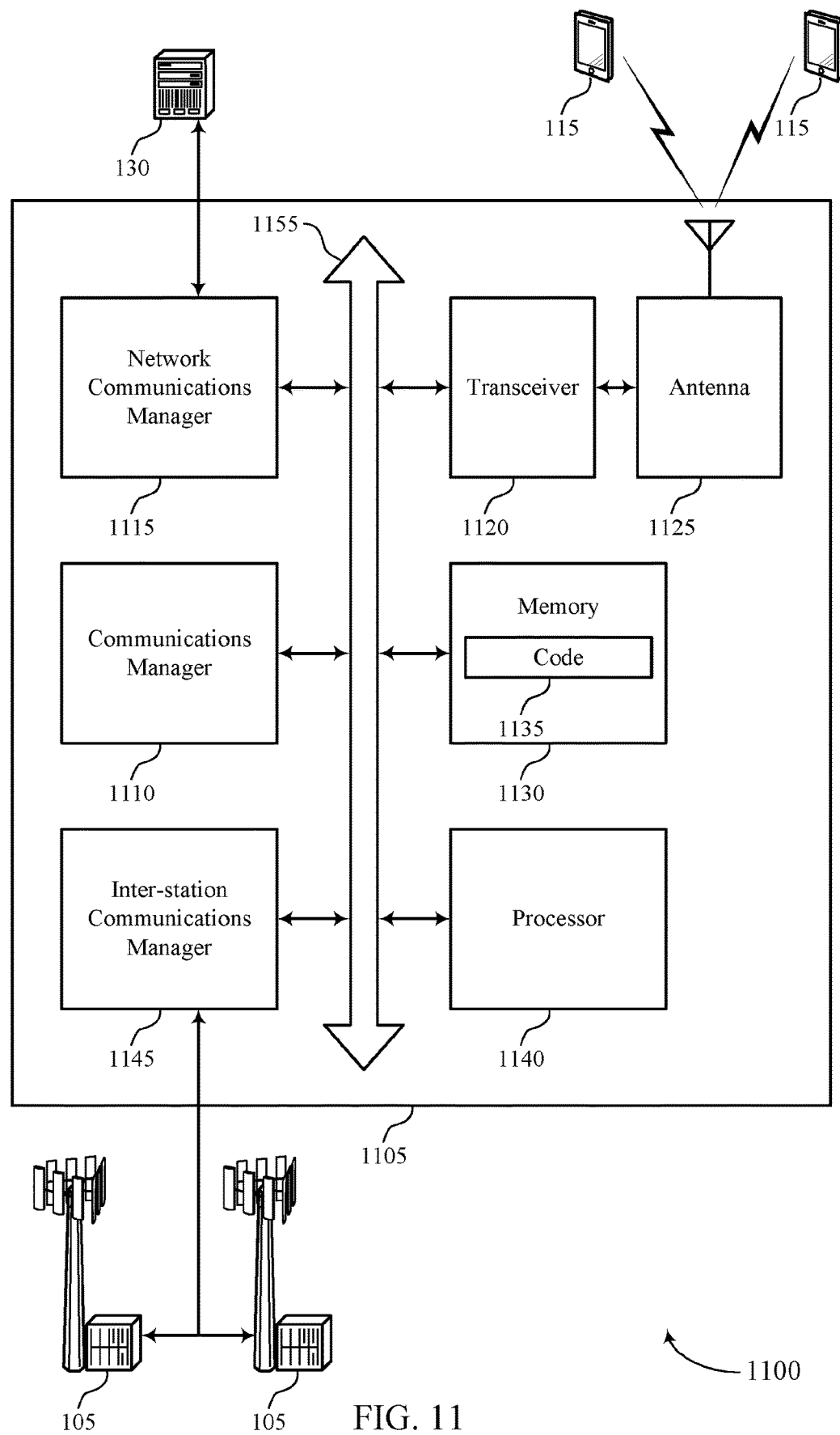
FIG. 11 shows a diagram of a system including a base station that supports full-duplex techniques in wireless communications in accordance with aspects of the present disclosure.

FIG. 11 shows a diagram of a system 1100 including a device 1105 that supports full-duplex techniques in wireless communications in accordance with aspects of the present disclosure. The device 1105 may be an example of or include the components of device 705, device 805, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1155).

The communications manager 1110 may receive, at a first wireless device, a first transmission from a base station via a first set of wireless resources, where the first set of wireless resources has a nominal transmission power, receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station, demodulate signals received in the first subset of wireless resources based on the reduced transmission power identifier, and demodulate signals received in the second subset of wireless resources based on the nominal transmission power.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting full-duplex techniques in wireless communications).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
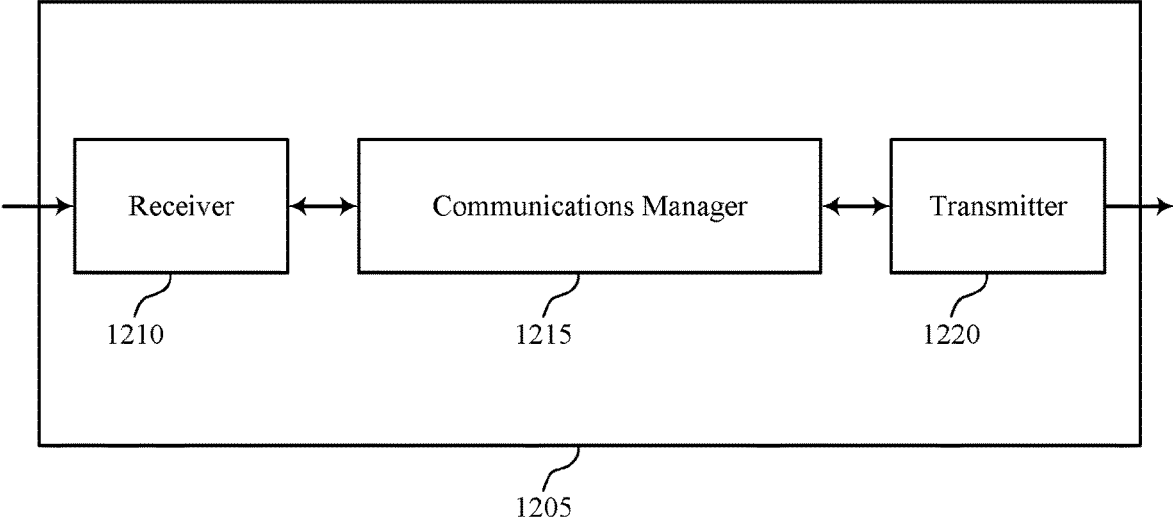
FIGS. 12 and 13 show block diagrams of devices that support full-duplex techniques in wireless communications in accordance with aspects of the present disclosure.

FIG. 12 shows a block diagram 1200 of a device 1205 that supports full-duplex techniques in wireless communications in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to full-duplex techniques in wireless communications, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify, at a base station, a first set of wireless resources for a first transmission to a first wireless device, determine a nominal transmission power for the first transmission, determine a reduced transmission power relative to the nominal transmission power for a first portion of the first transmission to be transmitted in the first subset of wireless resources, where the reduced transmission power is applied during full-duplex communications using the first subset of wireless resources, transmit, to the first wireless device, a reduced transmission power identifier that indicates the first subset of the first set of wireless resources has the reduced transmission power relative to the nominal transmission power, receive an indication that a second wireless device is to transmit to the base station using a first subset of the first set of wireless resources, and transmit the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
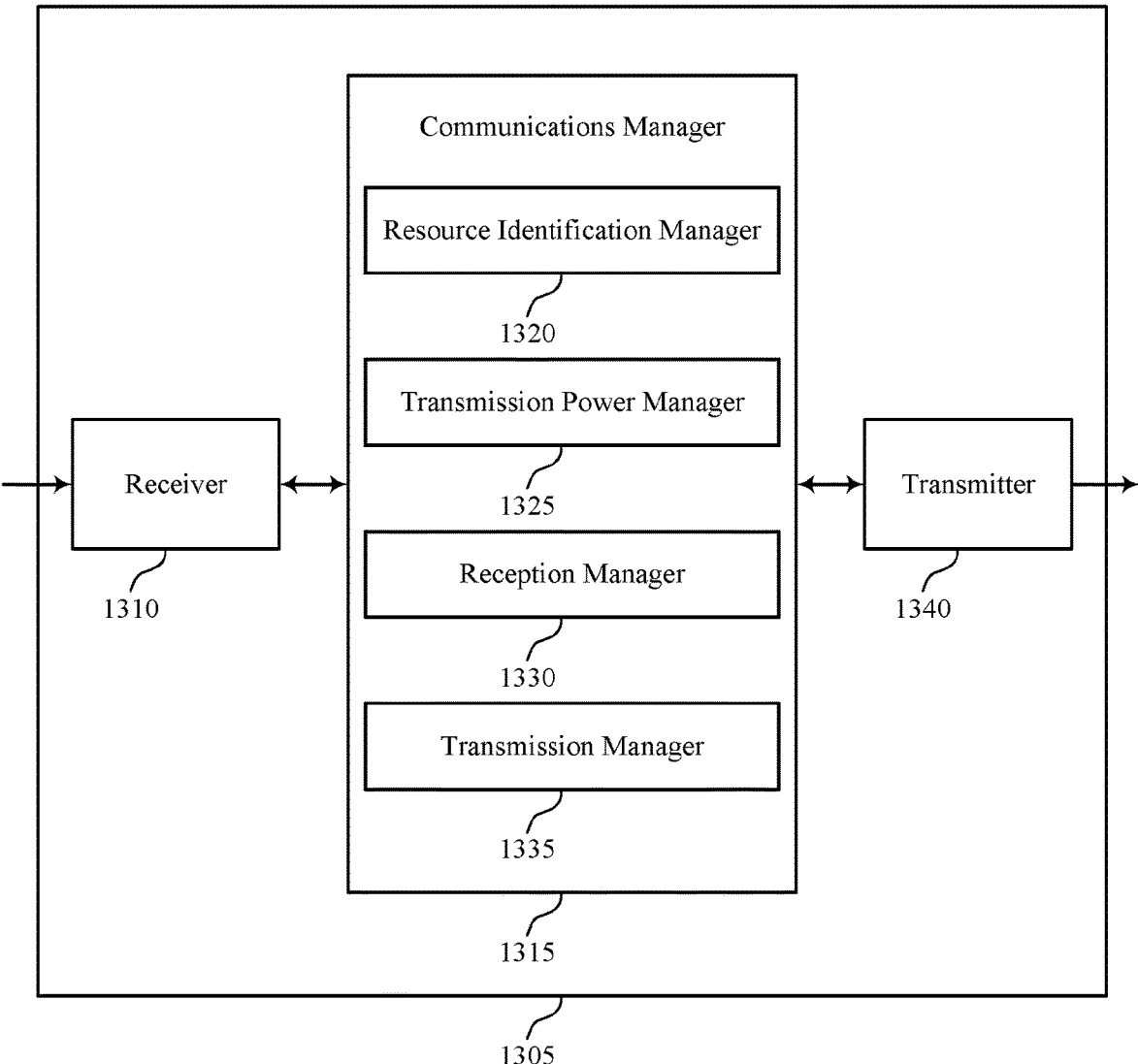

FIG. 13 shows a block diagram 1300 of a device 1305 that supports full-duplex techniques in wireless communications in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to full-duplex techniques in wireless communications, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a resource identification manager 1320, a transmission power manager 1325, a reception manager 1330, and a transmission manager 1335. The communications manager 1315 may be an example of aspects of the communications manager 1510 described herein.

The resource identification manager 1320 may identify, at a base station, a first set of wireless resources for a first transmission to a first wireless device.

The transmission power manager 1325 may determine a nominal transmission power for the first transmission, determine a reduced transmission power relative to the nominal transmission power for a first portion of the first transmission to be transmitted in the first subset of wireless resources, where the reduced transmission power is applied during full-duplex communications using the first subset of wireless resources, and transmit, to the first wireless device, a reduced transmission power identifier that indicates the first subset of the first set of wireless resources has the reduced transmission power relative to the nominal transmission power.

The reception manager 1330 may receive an indication that a second wireless device is to transmit to the base station using a first subset of the first set of wireless resources.

The transmission manager 1335 may transmit the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
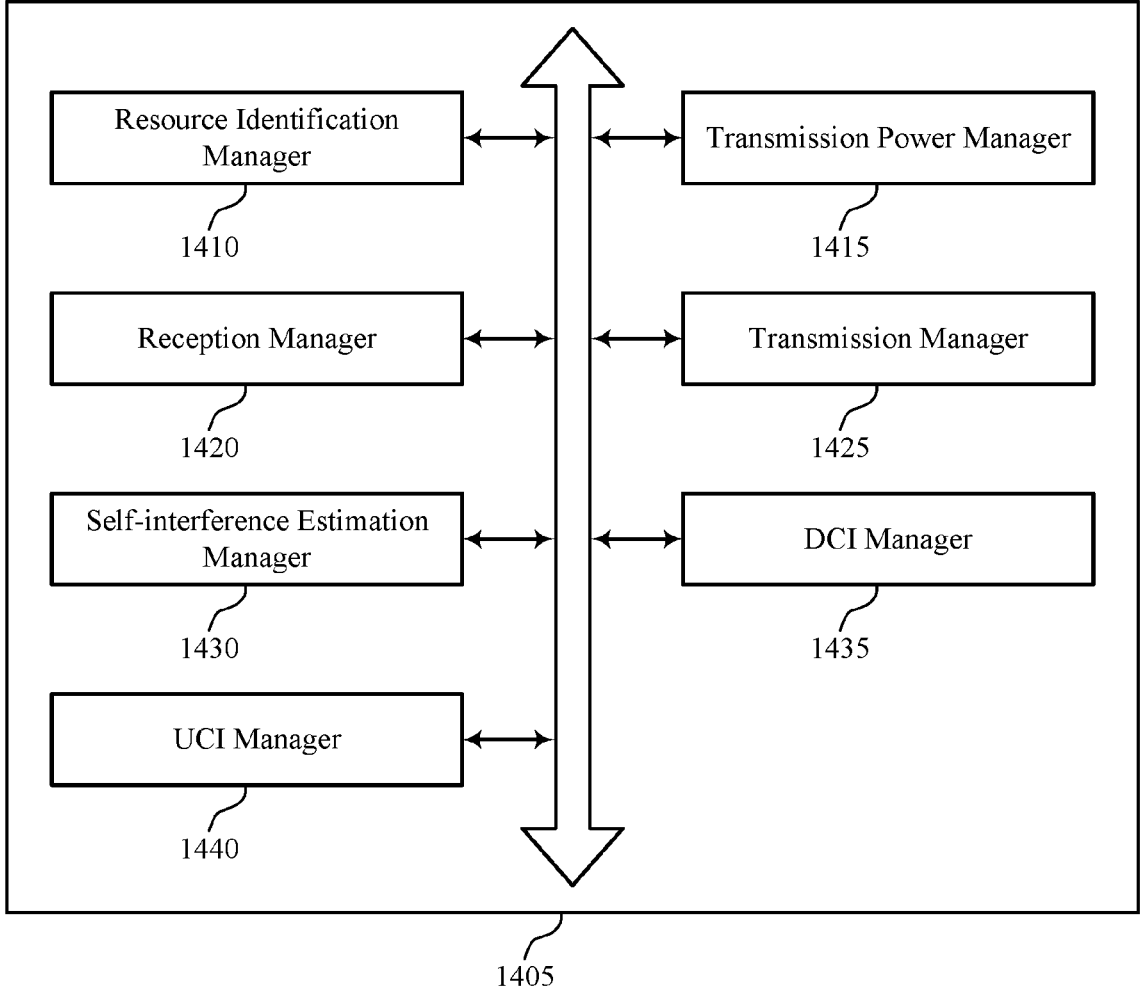
FIG. 14 shows a block diagram of a communications manager that supports full-duplex techniques in wireless communications in accordance with aspects of the present disclosure.

FIG. 14 shows a block diagram 1400 of a communications manager 1405 that supports full-duplex techniques in wireless communications in accordance with aspects of the present disclosure. The communications manager 1405 may be an example of aspects of a communications manager 1215, a communications manager 1315, or a communications manager 1510 described herein. The communications manager 1405 may include a resource identification manager 1410, a transmission power manager 1415, a reception manager 1420, a transmission manager 1425, a self-interference estimation manager 1430, a DCI manager 1435, and an UCI manager 1440. Each of these modules may communicate, directly or indirectly, with one another (e.g., via one or more buses).

The resource identification manager 1410 may identify, at a base station, a first set of wireless resources for a first transmission to a first wireless device. In some examples, a first subset of wireless resources may have a reduced transmission power, and the resource identification manager 1410 may transmit, to the first wireless device, a bitmap that indicates time-frequency resources of the first subset of wireless resources. In some examples, the resource identification manager 1410 may transmit, to the first wireless device, a joint indication of the first subset of wireless resources and a transmit power reduction value for the first subset of wireless resources. In some cases, the reduced transmission power identifier provides an indication of time resources, frequency resources, or combinations thereof, of the first subset of wireless resources, and an indication of an amount of power reduction relative to the nominal transmission power. In some cases, the reduced transmission power identifier includes a radio network temporary identifier that is associated with the first wireless device and is transmitted by the base station in control information associated with the first transmission.

In some cases, the first set of wireless resources is divided into a set of parts of time-frequency dimensions, and where each element of the bitmap is associated with a different part of the set of parts of time-frequency dimensions. In some cases, the first set of wireless resources is divided into a set of blocks of time-frequency resources, each block of time-frequency resources having a time-domain start position and length and a frequency-domain start position and length, and where the first subset of wireless resources is indicated by an identification of one or the set of blocks of time-frequency resources. In some cases, the first set of wireless resources is divided into a set of parts of time-frequency dimensions and the joint indication includes a bitmap, where a first segment of bits of the bitmap indicates a first transmit power reduction value for a first part of time-frequency dimensions, and a second segment of bits of the bitmap indicates a second transmit power reduction value for a second part of time-frequency dimensions.

The transmission power manager 1415 may determine a nominal transmission power for the first transmission. In some examples, the transmission power manager 1415 may determine a reduced transmission power relative to the nominal transmission power for a first portion of the first transmission to be transmitted in the first subset of wireless resources, where the reduced transmission power is applied during full-duplex communications using the first subset of wireless resources.

In some examples, the transmission power manager 1415 may transmit, to the first wireless device, a reduced transmission power identifier that indicates the first subset of the first set of wireless resources has the reduced transmission power relative to the nominal transmission power. In some examples, the transmission power manager 1415 may transmit, to the first wireless device, a transmit power reduction value for the first subset of wireless resources. In some cases, the reduced transmission power provides for reduced self-interference at the base station during full-duplex communications. In some cases, the transmit power reduction value is transmitted together with the reduced transmission power identifier or separately from the reduced transmission power identifier. In some cases, the transmit power reduction value is transmitted in a RRC message, in a medium access control (MAC) control element, in a physical layer message, or any combinations thereof.

In some cases, the transmit power reduction value is a static value provided in a system information transmission from the base station that is applied to multiple different wireless devices that receive transmissions from the base station. In some cases, the transmit power reduction value is transmitted in a dedicated message to the first wireless device, and where the dedicated message is transmitted in a different subset of wireless resources than the first subset of wireless resources or a different set of wireless resources than the first set of wireless resources. In some cases, the transmit power reduction value is a dynamic value transmitted in a control information transmission from the base station that is associated with the first set of wireless resources. In some cases, the control information transmission is a common downlink control information transmission or a dedicated control information transmission to the first wireless device.

The reception manager 1420 may receive an indication that a second wireless device is to transmit to the base station using a first subset of the first set of wireless resources.

The transmission manager 1425 may transmit the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission.

The self-interference estimation manager 1430 may determine a self-interference strength associated with the first transmission and the first subset of wireless resources. In some examples, the self-interference estimation manager 1430 may determine an amount of reduction of the nominal transmission power that is needed to reduce the self-interference strength to be at or below a threshold value. In some cases, the self-interference strength is based on a half-duplex interference-plus-noise power measurement at the base station, or a coefficient product the half-duplex interference-plus-noise power measurement.

The DCI manager 1435 may transmit downlink control information to the UE that indicates a downlink grant with the first set of wireless resources. In some cases, the downlink control information further indicates wireless resources for data transfer with the nominal transmission power.

The UCI manager 1440 may receive an uplink grant from the parent IAB node that indicates the first set of wireless resources for data transfer from the IAB node to the parent IAB node. In some cases, the uplink grant further indicates wireless resources for data transfer with the nominal transmission power.

Figure 15:
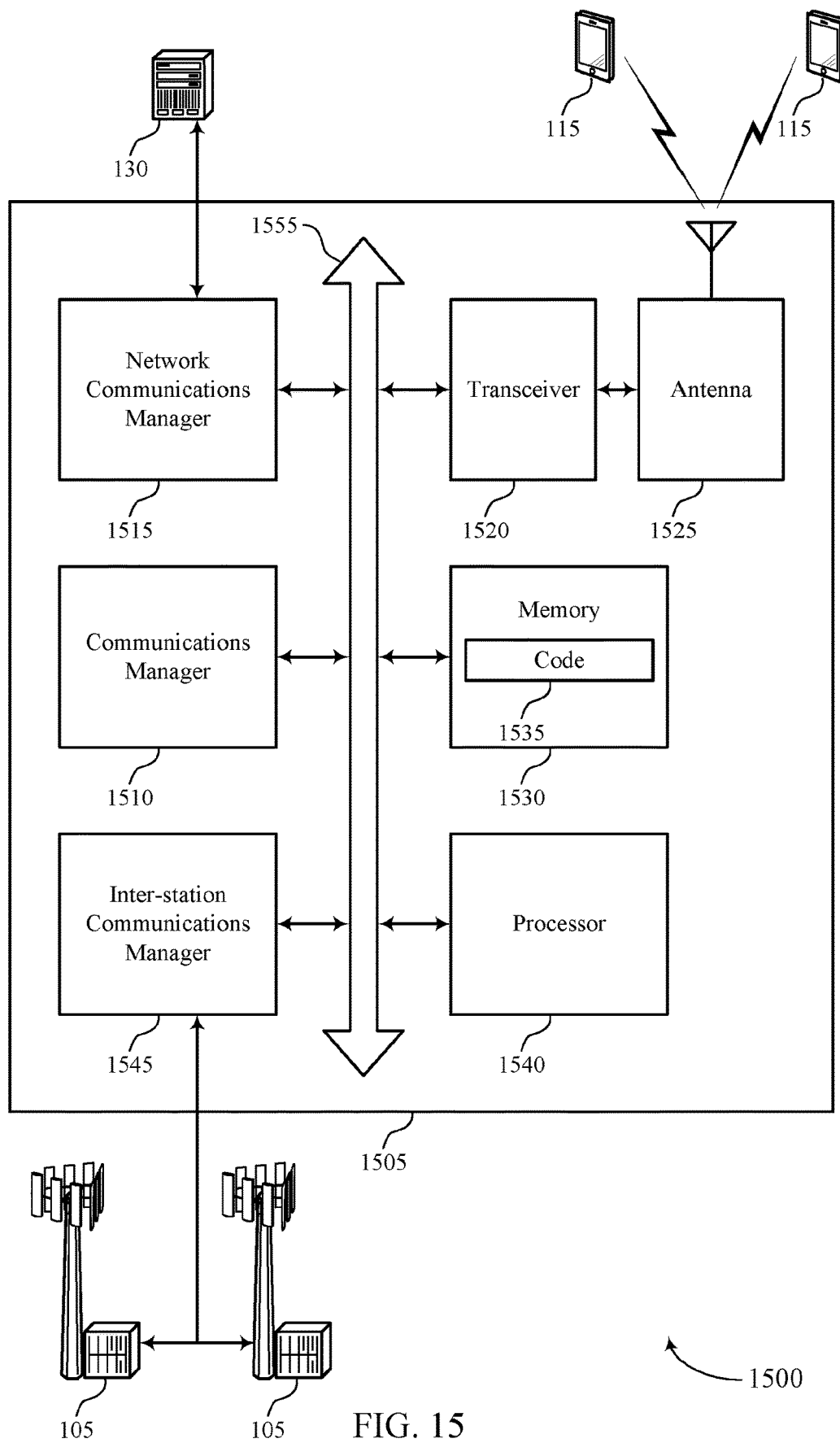
FIG. 15 shows a diagram of a system including a device that supports full-duplex techniques in wireless communications in accordance with aspects of the present disclosure.

FIG. 15 shows a diagram of a system 1500 including a device 1505 that supports full-duplex techniques in wireless communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1555).

The communications manager 1510 may identify, at a base station, a first set of wireless resources for a first transmission to a first wireless device, determine a nominal transmission power for the first transmission, determine a reduced transmission power relative to the nominal transmission power for a first portion of the first transmission to be transmitted in the first subset of wireless resources, where the reduced transmission power is applied during full-duplex communications using the first subset of wireless resources, transmit, to the first wireless device, a reduced transmission power identifier that indicates the first subset of the first set of wireless resources has the reduced transmission power relative to the nominal transmission power, receive an indication that a second wireless device is to transmit to the base station using a first subset of the first set of wireless resources, and transmit the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting full-duplex techniques in wireless communications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

FIG. 16 shows a flowchart illustrating a method 1600 that supports full-duplex techniques in wireless communications in accordance with aspects of the present disclosure. The operations of method 1600 may be implemented by a UE 115 or base station 105 or its components as described herein. For example, the operations of method 1600 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1605, the UE or base station may receive a first transmission from a base station via a first set of wireless resources, where the first set of wireless resources has a nominal transmission power. The operations of 1605 may be performed according to the methods described herein. In some examples, aspects of the operations of 1605 may be performed by a reception manager as described with reference to FIGS. 7 through 11.

At 1610, the UE or base station may receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station. The operations of 1610 may be performed according to the methods described herein. In some examples, aspects of the operations of 1610 may be performed by a transmission power manager as described with reference to FIGS. 7 through 11. In some cases, the transmit power reduction value is a dynamic value received in a control information transmission from the base station that is associated with the first set of wireless resources. In some cases, the control information transmission is a common control information transmission or a dedicated control information transmission to the first wireless device.

At 1615, the UE or base station may demodulate signals received in the first subset of wireless resources based on the reduced transmission power identifier, and demodulate signals received in the second subset of wireless resources based on the nominal transmission power. The operations of 1615 may be performed according to the methods described herein. In some examples, aspects of the operations of 1615 may be performed by a demodulation manager as described with reference to FIGS. 7 through 11.

FIG. 17 shows a flowchart illustrating a method 1700 that supports full-duplex techniques in wireless communications in accordance with aspects of the present disclosure. The operations of method 1700 may be implemented by a UE 115 or base station 105 or its components as described herein. For example, the operations of method 1700 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1705, the UE or base station may receive, from the base station, a transmit power reduction value for the first subset of wireless resources. The operations of 1705 may be performed according to the methods described herein. In some examples, aspects of the operations of 1705 may be performed by a transmission power manager as described with reference to FIGS. 7 through 11. In some cases, the transmit power reduction value may be received together with a reduced transmission power identifier or separately from the reduced transmission power identifier. In some cases, the transmit power reduction value is received in a RRC message, in a MAC-CE, in a physical layer message, or any combinations thereof. In some cases, the transmit power reduction value is a static value received in a system information transmission from the base station that is applied to multiple different wireless devices that receive transmissions from the base station. In some cases, the transmit power reduction value is received in a dedicated message to the first wireless device, and where the dedicated message is received in a different subset of wireless resources than the first subset of wireless resources or a different set of wireless resources than the first set of wireless resources.

At 1710, the UE or base station may receive a first transmission from the base station via a first set of wireless resources, where the first set of wireless resources has a nominal transmission power. The operations of 1710 may be performed according to the methods described herein. In some examples, aspects of the operations of 1710 may be performed by a reception manager as described with reference to FIGS. 7 through 11.

At 1715, the UE or base station may receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station. The operations of 1715 may be performed according to the methods described herein. In some examples, aspects of the operations of 1715 may be performed by a transmission power manager as described with reference to FIGS. 7 through 11.

At 1720, the UE or base station may demodulate signals received in the first subset of wireless resources based on the reduced transmission power identifier, and demodulate signals received in the second subset of wireless resources based on the nominal transmission power. The operations of 1720 may be performed according to the methods described herein. In some examples, aspects of the operations of 1720 may be performed by a demodulation manager as described with reference to FIGS. 7 through 11.

FIG. 18 shows a flowchart illustrating a method 1800 that supports full-duplex techniques in wireless communications in accordance with aspects of the present disclosure. The operations of method 1800 may be implemented by a UE 115 or base station 105 or its components as described herein. For example, the operations of method 1800 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1805, the UE or base station may receive a first transmission from a base station via a first set of wireless resources, where the first set of wireless resources has a nominal transmission power. The operations of 1805 may be performed according to the methods described herein. In some examples, aspects of the operations of 1805 may be performed by a reception manager as described with reference to FIGS. 7 through 11.

At 1810, the UE or base station may receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station. The operations of 1810 may be performed according to the methods described herein. In some examples, aspects of the operations of 1810 may be performed by a transmission power manager as described with reference to FIGS. 7 through 11.

At 1815, the UE or base station may receive, from the base station, a bitmap that indicates time-frequency resources of the first subset of wireless resources. The operations of 1815 may be performed according to the methods described herein. In some examples, aspects of the operations of 1815 may be performed by a resource identification manager as described with reference to FIGS. 7 through 11. In some cases, the first set of wireless resources is divided into a set of parts of time-frequency dimensions, and where each element of the bitmap is associated with a different part of the set of parts of time-frequency dimensions. In some cases, the first set of wireless resources is divided into a set of blocks of time-frequency resources, each block of time-frequency resources having a time-domain start position and length and a frequency-domain start position and length, and where the first subset of wireless resources is indicated by an identification of one or more of the set of blocks of time-frequency resources.

At 1820, the UE or base station may demodulate signals received in the first subset of wireless resources based on the reduced transmission power identifier, and demodulate signals received in the second subset of wireless resources based on the nominal transmission power. The operations of 1820 may be performed according to the methods described herein. In some examples, aspects of the operations of 1820 may be performed by a demodulation manager as described with reference to FIGS. 7 through 11.

FIG. 19 shows a flowchart illustrating a method 1900 that supports full-duplex techniques in wireless communications in accordance with aspects of the present disclosure. The operations of method 1900 may be implemented by a UE 115 or base station 105 or its components as described herein. For example, the operations of method 1900 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1905, the UE or base station may receive a first transmission from a base station via a first set of wireless resources, where the first set of wireless resources has a nominal transmission power. The operations of 1905 may be performed according to the methods described herein. In some examples, aspects of the operations of 1905 may be performed by a reception manager as described with reference to FIGS. 7 through 11.

At 1910, the UE or base station may receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station. The operations of 1910 may be performed according to the methods described herein. In some examples, aspects of the operations of 1910 may be performed by a transmission power manager as described with reference to FIGS. 7 through 11.

At 1915, the UE or base station may perform channel estimation and demodulation of signals received in the first subset of wireless resources based on the reduced transmission power identifier. The operations of 1915 may be performed according to the methods described herein. In some examples, aspects of the operations of 1915 may be performed by a demodulation manager as described with reference to FIGS. 7 through 11.

At 1920, the UE or base station may perform channel estimation and demodulation of signals received in the second subset of wireless resources based on the nominal transmission power. The operations of 1920 may be performed according to the methods described herein. In some examples, aspects of the operations of 1920 may be performed by a demodulation manager as described with reference to FIGS. 7 through 11. In some cases, the channel estimation and demodulation of the signals received in the first subset of wireless resources is based on a demodulation reference signal that is transmitted in the first subset of wireless resources. In some cases, the channel estimation and demodulation of the signals received in the first subset of wireless resources is based on a demodulation reference signal that is transmitted in the second subset of wireless resources, and where a channel gain of the second subset of wireless resources determined based on the demodulation reference signal is adjusted based on the reduced transmission power to obtain an adjusted channel gain associated with the first subset of wireless resources.

At 1925, the UE or base station may combine demodulated signals of the first subset of wireless resources and the second subset of wireless resources. The operations of 1925 may be performed according to the methods described herein. In some examples, aspects of the operations of 1925 may be performed by a demodulation manager as described with reference to FIGS. 7 through 11.

At 1930, the UE or base station may decode the combined demodulated signals. The operations of 1930 may be performed according to the methods described herein. In some examples, aspects of the operations of 1930 may be performed by a demodulation manager as described with reference to FIGS. 7 through 11.

Figure 20:
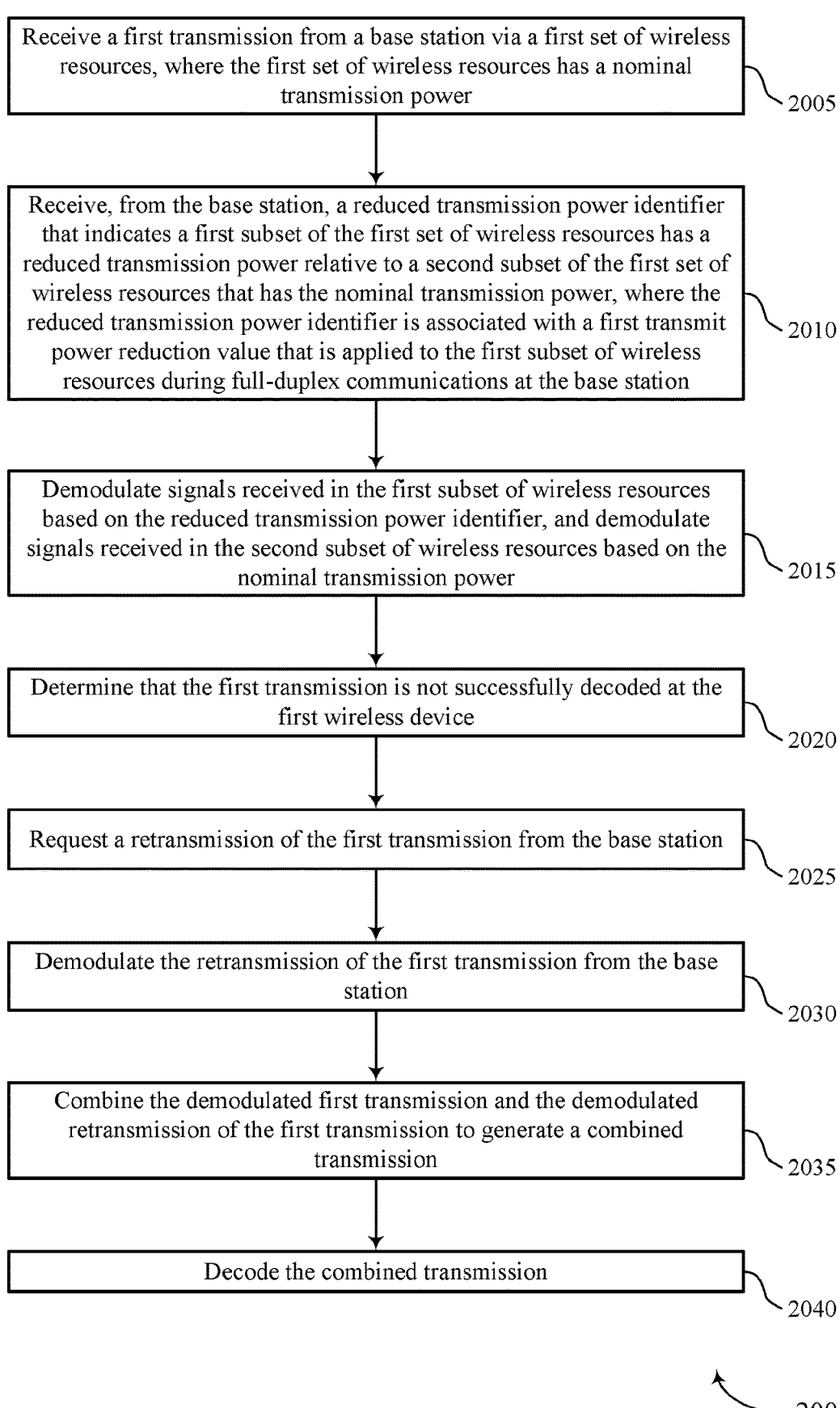

FIG. 20 shows a flowchart illustrating a method 2000 that supports full-duplex techniques in wireless communications in accordance with aspects of the present disclosure. The operations of method 2000 may be implemented by a UE 115 or base station 105 or its components as described herein. For example, the operations of method 2000 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 2005, the UE or base station may receive a first transmission from a base station via a first set of wireless resources, where the first set of wireless resources has a nominal transmission power. The operations of 2005 may be performed according to the methods described herein. In some examples, aspects of the operations of 2005 may be performed by a reception manager as described with reference to FIGS. 7 through 11.

At 2010, the UE or base station may receive, from the base station, a reduced transmission power identifier that indicates a first subset of the first set of wireless resources has a reduced transmission power relative to a second subset of the first set of wireless resources that has the nominal transmission power, where the reduced transmission power identifier is associated with a first transmit power reduction value that is applied to the first subset of wireless resources during full-duplex communications at the base station. The operations of 2010 may be performed according to the methods described herein. In some examples, aspects of the operations of 2010 may be performed by a transmission power manager as described with reference to FIGS. 7 through 11.

At 2015, the UE or base station may demodulate signals received in the first subset of wireless resources based on the reduced transmission power identifier, and demodulate signals received in the second subset of wireless resources based on the nominal transmission power. The operations of 2015 may be performed according to the methods described herein. In some examples, aspects of the operations of 2015 may be performed by a demodulation manager as described with reference to FIGS. 7 through 11.

At 2020, the UE or base station may determine that the first transmission is not successfully decoded at the first wireless device. The operations of 2020 may be performed according to the methods described herein. In some examples, aspects of the operations of 2020 may be performed by a reception manager as described with reference to FIGS. 7 through 11.

At 2025, the UE or base station may request a retransmission of the first transmission from the base station. The operations of 2025 may be performed according to the methods described herein. In some examples, aspects of the operations of 2025 may be performed by a reception manager as described with reference to FIGS. 7 through 11.

At 2030, the UE or base station may demodulate the retransmission of the first transmission from the base station. The operations of 2030 may be performed according to the methods described herein. In some examples, aspects of the operations of 2030 may be performed by a demodulation manager as described with reference to FIGS. 7 through 11.

At 2035, the UE or base station may combine the demodulated first transmission and the demodulated retransmission of the first transmission to generate a combined transmission. The operations of 2035 may be performed according to the methods described herein. In some examples, aspects of the operations of 2035 may be performed by a demodulation manager as described with reference to FIGS. 7 through 11.

At 2040, the UE or base station may decode the combined transmission. The operations of 2040 may be performed according to the methods described herein. In some examples, aspects of the operations of 2040 may be performed by a demodulation manager as described with reference to FIGS. 7 through 11.

FIG. 21 shows a flowchart illustrating a method 2100 that supports full-duplex techniques in wireless communications in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may identify a first set of wireless resources for a first transmission to a first wireless device. The operations of 2105 may be performed according to the methods described herein. In some examples, aspects of the operations of 2105 may be performed by a resource identification manager as described with reference to FIGS. 12 through 15.

At 2110, the base station may determine a nominal transmission power for the first transmission. The operations of 2110 may be performed according to the methods described herein. In some examples, aspects of the operations of 2110 may be performed by a transmission power manager as described with reference to FIGS. 12 through 15.

At 2115, the base station may receive an indication that a second wireless device is to transmit to the base station using a first subset of the first set of wireless resources. The operations of 2115 may be performed according to the methods described herein. In some examples, aspects of the operations of 2115 may be performed by a reception manager as described with reference to FIGS. 12 through 15.

At 2120, the base station may determine a reduced transmission power relative to the nominal transmission power for a first portion of the first transmission to be transmitted in the first subset of wireless resources, where the reduced transmission power is applied during full-duplex communications using the first subset of wireless resources. The operations of 2120 may be performed according to the methods described herein. In some examples, aspects of the operations of 2120 may be performed by a transmission power manager as described with reference to FIGS. 12 through 15.

At 2125, the base station may transmit the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission. The operations of 2125 may be performed according to the methods described herein. In some examples, aspects of the operations of 2125 may be performed by a transmission manager as described with reference to FIGS. 12 through 15.

At 2130, the base station may transmit, to the first wireless device, a reduced transmission power identifier that indicates the first subset of the first set of wireless resources has the reduced transmission power relative to the nominal transmission power. The operations of 2130 may be performed according to the methods described herein. In some examples, aspects of the operations of 2130 may be performed by a transmission power manager as described with reference to FIGS. 12 through 15.

FIG. 22 shows a flowchart illustrating a method 2200 that supports full-duplex techniques in wireless communications in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2205, the base station may identify a first set of wireless resources for a first transmission to a first wireless device. The operations of 2205 may be performed according to the methods described herein. In some examples, aspects of the operations of 2205 may be performed by a resource identification manager as described with reference to FIGS. 12 through 15.

At 2210, the base station may determine a nominal transmission power for the first transmission. The operations of 2210 may be performed according to the methods described herein. In some examples, aspects of the operations of 2210 may be performed by a transmission power manager as described with reference to FIGS. 12 through 15.

At 2215, the base station may receive an indication that a second wireless device is to transmit to the base station using a first subset of the first set of wireless resources. The operations of 2215 may be performed according to the methods described herein. In some examples, aspects of the operations of 2215 may be performed by a reception manager as described with reference to FIGS. 12 through 15.

At 2220, the base station may determine a self-interference strength associated with the first transmission and the first subset of wireless resources. The operations of 2220 may be performed according to the methods described herein. In some examples, aspects of the operations of 2220 may be performed by a self-interference estimation manager as described with reference to FIGS. 12 through 15. In some cases, the self-interference strength is based on a half-duplex interference-plus-noise power measurement at the base station, or a coefficient product the half-duplex interference-plus-noise power measurement.

At 2225, the base station may determine an amount of reduction of the nominal transmission power that is needed to reduce the self-interference strength to be at or below a threshold value. The operations of 2225 may be performed according to the methods described herein. In some examples, aspects of the operations of 2225 may be performed by a self-interference estimation manager as described with reference to FIGS. 12 through 15.

At 2230, the base station may determine a reduced transmission power relative to the nominal transmission power for a first portion of the first transmission to be transmitted in the first subset of wireless resources, where the reduced transmission power is applied during full-duplex communications using the first subset of wireless resources. The operations of 2230 may be performed according to the methods described herein. In some examples, aspects of the operations of 2230 may be performed by a transmission power manager as described with reference to FIGS. 12 through 15.

At 2235, the base station may transmit the first transmission to the first wireless device using the first set of wireless resources while receiving a second transmission from the second wireless device using the first subset of wireless resources, where the first subset of wireless resources has the reduced transmission power in the first transmission and a second subset of the first set of wireless resources has the nominal transmission power in the first transmission. The operations of 2235 may be performed according to the methods described herein. In some examples, aspects of the operations of 2235 may be performed by a transmission manager as described with reference to FIGS. 12 through 15.

At 2240, the base station may transmit, to the first wireless device, a reduced transmission power identifier that indicates the first subset of the first set of wireless resources has the reduced transmission power relative to the nominal transmission power. The operations of 2240 may be performed according to the methods described herein. In some examples, aspects of the operations of 2240 may be performed by a transmission power manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a first wireless device, a first transmission from a base station via a first set of wireless resources, wherein the first set of wireless resources has a nominal transmission power;
receiving, from the base station, a reduced transmission power identifier that indicates a first subset of the first set of wireless resources has a reduced transmission power relative to a second subset of the first set of wireless resources that has the nominal transmission power;
receiving, from the base station, a transmit power reduction value for the first subset of wireless resources, wherein the transmit power reduction value is associated with a first transmit power reduction value that is applied to the first subset of wireless resources during full-duplex communications at the base station, and wherein the transmit power reduction value is received separately from the reduced transmission power identifier;
demodulating signals received in the first subset of wireless resources based at least in part on the reduced transmission power identifier and on the transmit power reduction value, and demodulating signals received in the second subset of wireless resources based at least in part on the nominal transmission power; and
decoding data associated with the first transmission based at least in part on combining demodulated signals received in the first subset and demodulated signals received in the second subset.

2. The method of claim 1, wherein the reduced transmission power provides for reduced self-interference at the base station during full-duplex communications.

3. The method of claim 1, wherein the reduced transmission power identifier provides an indication of time resources, frequency resources, or combinations thereof, of the first subset of wireless resources, and an indication of an amount of power reduction relative to the nominal transmission power.

4. The method of claim 1, wherein the first wireless device is a user equipment (UE), and wherein the method further comprises:

receiving downlink control information from the base station that indicates a downlink grant with the first set of wireless resources.

5. The method of claim 4, wherein the downlink control information further indicates wireless resources for data transfer with the nominal transmission power.

6. The method of claim 1, wherein the first wireless device is a parent integrated access and backhaul (IAB) node and the base station is an IAB node, and wherein the method further comprises:

transmitting an uplink grant to the base station that indicates the first set of wireless resources for data transfer from the IAB node to the parent IAB node.

7. The method of claim 6, wherein the uplink grant further indicates wireless resources for data transfer with the nominal transmission power.

8. The method of claim 1, wherein the transmit power reduction value is received in a radio resource control (RRC) message, in a medium access control (MAC) control element, in a physical layer message, or any combinations thereof.

9. The method of claim 1, wherein the transmit power reduction value is a static value received in a system information transmission from the base station that is applied to multiple different wireless devices that receive transmissions from the base station.

10. The method of claim 1, wherein the transmit power reduction value is received in a dedicated message to the first wireless device, and wherein the dedicated message is received in a different subset of wireless resources than the first subset of wireless resources or a different set of wireless resources than the first set of wireless resources.

11. The method of claim 1, wherein the transmit power reduction value is a dynamic value received in a control information transmission from the base station that is associated with the first set of wireless resources.

12. The method of claim 1, further comprising:

receiving, from the base station, a bitmap that indicates time-frequency resources of the first subset of wireless resources.

13. An apparatus for wireless communication, comprising:

one or more processors, memory coupled with the one or more processors; and instructions stored in the memory and executable by the one or more processors to cause the apparatus to:

receive, at a first wireless device, a first transmission from a base station via a first set of wireless resources, wherein the first set of wireless resources has a nominal transmission power;

receive, from the base station, a reduced transmission power identifier that indicates a first subset of the first set of wireless resources has a reduced transmission power relative to a second subset of the first set of wireless resources that has the nominal transmission power;

receive, from the base station, a transmit power reduction value for the first subset of wireless resources, wherein the reduced transmission power identifier transmit power reduction value is associated with a first transmit power reduction value that is applied to the first subset of wireless resources during full-duplex communications at the base station, and wherein the transmit power reduction value is received separately from the reduced transmission power identifier;

demodulate signals received in the first subset of wireless resources based at least in part on the reduced transmission power identifier and on the transmit power reduction value, and demodulate signals received in the second subset of wireless resources based at least in part on the nominal transmission power; and decode data associated with the first transmission based at least in part on combining demodulated signals received in the first subset and demodulated signals received in the second subset.

14. The apparatus of claim 13, wherein the reduced transmission power provides for reduced self-interference at the base station during full-duplex communications.

15. The apparatus of claim 13, wherein the reduced transmission power identifier provides an indication of time resources, frequency resources, or combinations thereof, of the first subset of wireless resources, and an indication of an amount of power reduction relative to the nominal transmission power.

16. The apparatus of claim 13, wherein the first wireless device is a user equipment (UE), and wherein the instructions are further executable by the one or more processors to cause the apparatus to:

receive downlink control information from the base station that indicates a downlink grant with the first set of wireless resources.

17. The apparatus of claim 16, wherein the downlink control information further indicates wireless resources for data transfer with the nominal transmission power.

18. The apparatus of claim 13, wherein the first wireless device is a parent integrated access and backhaul (IAB) node and the base station is an IAB node, and wherein the instructions are further executable by the one or more processors to cause the apparatus to:

transmit an uplink grant to the base station that indicates the first set of wireless resources for data transfer from the IAB node to the parent IAB node.

19. The apparatus of claim 18, wherein the uplink grant further indicates wireless resources for data transfer with the nominal transmission power.

20. The apparatus of claim 13, wherein the transmit power reduction value is received in a radio resource control (RRC) message, in a medium access control (MAC) control element, in a physical layer message, or any combinations thereof.

21. The apparatus of claim 13, wherein the transmit power reduction value is a static value received in a system information transmission from the base station that is applied to multiple different wireless devices that receive transmissions from the base station.

22. The apparatus of claim 13, wherein the transmit power reduction value is received in a dedicated message to the first wireless device, and wherein the dedicated message is received in a different subset of wireless resources than the first subset of wireless resources or a different set of wireless resources than the first set of wireless resources.

23. The apparatus of claim 13, wherein the transmit power reduction value is a dynamic value received in a control information transmission from the base station that is associated with the first set of wireless resources.

24. The apparatus of claim 13, wherein the instructions are further executable by the one or more processors to cause the apparatus to:

receive, from the base station, a bitmap that indicates time-frequency resources of the first subset of wireless resources.

25. A non-transitory computer-readable medium storing code for wireless communications, the code comprising instructions executable by one or more processors to:

receive, at a first wireless device, a first transmission from a base station via a first set of wireless resources, wherein the first set of wireless resources has a nominal transmission power;

receive, from the base station, a reduced transmission power identifier that indicates a first subset of the first set of wireless resources has a reduced transmission power relative to a second subset of the first set of wireless resources that has the nominal transmission power;

receiving, from the base station, a transmit power reduction value for the first subset of wireless resources, wherein the transmit power reduction value is associated with a first transmit power reduction value that is applied to the first subset of wireless resources during full-duplex communications at the base station, and wherein the transmit power reduction value is received separately from the reduced transmission power identifier;

demodulate signals received in the first subset of wireless resources based at least in part on the reduced transmission power identifier and on the transmit power reduction value, and demodulating signals received in the second subset of wireless resources based at least in part on the nominal transmission power; and decode data associated with the first transmission based at least in part on combining demodulated signals received in the first subset and demodulated signals received in the second subset.

26. An apparatus for wireless communications, comprising:

means for receiving, at a first wireless device, a first transmission from a base station via a first set of wireless resources, wherein the first set of wireless resources has a nominal transmission power;

means for receiving, from the base station, a reduced transmission power identifier that indicates a first subset of the first set of wireless resources has a reduced transmission power relative to a second subset of the first set of wireless resources that has the nominal transmission power;

means for receiving, from the base station, a transmit power reduction value for the first subset of wireless resources, wherein the transmit power reduction value is associated with a first transmit power reduction value that is applied to the first subset of wireless resources during full-duplex communications at the base station, and wherein the transmit power reduction value is received separately from the reduced transmission power identifier;

means for demodulating signals received in the first subset of wireless resources based at least in part on the reduced transmission power identifier and on the transmit power reduction value, and demodulating signals received in the second subset of wireless resources based at least in part on the nominal transmission power; and decode data associated with the first transmission based at least in part on combining demodulated signals received in the first subset and demodulated signals received in the second subset.

* * * * *